(12) United States Patent
Ishikawa et al.

(10) Patent No.: US 10,672,309 B2
(45) Date of Patent: Jun. 2, 2020

(54) ELECTRONIC APPARATUS AND METHOD OF PROVIDING IMAGE ON A WEARABLE OPTICAL DEVICE

(71) Applicant: SONY CORPORATION, Tokyo (JP)

(72) Inventors: Hirotaka Ishikawa, Kanagawa (JP); Takeshi Iwatsu, Kanagawa (JP); Tsubasa Tsukahara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/118,584

(22) PCT Filed: Nov. 18, 2014

(86) PCT No.: PCT/JP2014/080544
§ 371 (c)(1),
(2) Date: Aug. 16, 2016

(87) PCT Pub. No.: WO2015/125363
PCT Pub. Date: Aug. 27, 2015

(65) Prior Publication Data
US 2017/0053575 A1    Feb. 23, 2017

(30) Foreign Application Priority Data

Feb. 21, 2014    (JP) .................................. 2014-031604

(51) Int. Cl.
*G09G 3/00*    (2006.01)
*G06F 3/14*    (2006.01)
(Continued)

(52) U.S. Cl.
CPC ........... *G09G 3/001* (2013.01); *G02B 27/017* (2013.01); *G02B 27/0172* (2013.01);
(Continued)

(58) Field of Classification Search
CPC ....... G09G 2360/144; G09G 2320/066; G09G 2354/00; G09G 2370/022; G09G 2320/08;
(Continued)

(56) References Cited

U.S. PATENT DOCUMENTS

2001/0020989 A1* 9/2001 Nakayama ............ G02F 1/1336
349/61
2003/0122810 A1* 7/2003 Tsirkel ..................... G09G 3/20
345/207
(Continued)

FOREIGN PATENT DOCUMENTS

JP    9-508711 A    9/1997
JP    09-508711 A    9/1997
(Continued)

OTHER PUBLICATIONS

PTO 137658 English translation of JP-2011175035-A (Year: 2011).*
(Continued)

*Primary Examiner* — William A Beutel
(74) *Attorney, Agent, or Firm* — Chip Law Group

(57) ABSTRACT

To enhance visibility of an image provided by a wearable optical device depending on different situations. Provided is an electronic apparatus including an illuminance information acquisition unit (510) configured to acquire illuminance information indicating illuminance of light incident on a wearable optical device toward a viewer from a real space, a situation information acquisition unit (540) configured to acquire situation information indicating a situation surrounding the wearable optical device, a luminance determination unit (520) configured to determine luminance of light emitted by the wearable optical device to allow the viewer to perceive an image superimposed on the real space, the determination of luminance being performed on a basis of the illuminance information and the situation information,
(Continued)

and a controller (530) configured to control the wearable optical device to cause the wearable optical device to emit light having the determined luminance.

17 Claims, 20 Drawing Sheets

(51) Int. Cl.
*G02B 27/01* (2006.01)
*G06F 1/16* (2006.01)
*G06F 3/01* (2006.01)
*H04N 5/64* (2006.01)

(52) U.S. Cl.
CPC ............ *G06F 1/163* (2013.01); *G06F 3/011* (2013.01); *G06F 3/14* (2013.01); *G02B 2027/0118* (2013.01); *G02B 2027/0138* (2013.01); *G02B 2027/0178* (2013.01); *G09G 2320/066* (2013.01); *G09G 2320/08* (2013.01); *G09G 2354/00* (2013.01); *G09G 2360/144* (2013.01); *G09G 2370/022* (2013.01); *H04N 5/64* (2013.01)

(58) Field of Classification Search
CPC ............ G09G 3/001; G02B 2027/0138; G02B 2027/0178; G02B 2027/0118; G02B 27/017; G02B 27/0172; G06F 3/011; G06F 3/14; H04N 5/64
See application file for complete search history.

(56) References Cited

U.S. PATENT DOCUMENTS

| | | | | |
|---|---|---|---|---|
| 2013/0015770 A1* | 1/2013 | Aitken | ................. | G09G 3/3406 315/154 |
| 2013/0083499 A1* | 4/2013 | Kamiya | ................. | B41J 13/103 361/752 |
| 2013/0147859 A1* | 6/2013 | Kobayashi | ............... | G09G 5/10 345/690 |
| 2013/0241950 A1* | 9/2013 | Mihara | .................... | G09G 3/20 345/589 |
| 2013/0336629 A1* | 12/2013 | Mulholland | ............. | H04N 9/87 386/230 |
| 2014/0125785 A1* | 5/2014 | Na | ........................ | G02B 27/017 348/56 |
| 2014/0176518 A1* | 6/2014 | Min | ......................... | G09G 3/20 345/207 |

FOREIGN PATENT DOCUMENTS

| | | | |
|---|---|---|---|
| JP | 11-161190 A | | 6/1999 |
| JP | 2002-268002 A | | 9/2002 |
| JP | 2002-323690 A | | 11/2002 |
| JP | 2005-262478 A | | 9/2005 |
| JP | 2006-285064 A | | 10/2006 |
| JP | 2011-028136 A | | 2/2011 |
| JP | 2011175035 A | * | 9/2011 |
| JP | 2012-203128 A | | 10/2012 |
| JP | 2013-511744 A | | 4/2013 |
| JP | 2013-137413 A | | 7/2013 |
| JP | 2013-174898 A | | 9/2013 |
| JP | 2013-197637 A | | 9/2013 |
| JP | 2014-010460 A | | 1/2014 |
| WO | 2012/137759 A | | 10/2012 |
| WO | 2012/137759 A1 | | 10/2012 |

OTHER PUBLICATIONS

Written Opinion received for PCT Application No. PCT/JP2014/080544, dated Feb. 24, 2015, 12 pages of report including 7 pages of English translation.
International preliminary report on patentability for PCT Application No. PCT/JP2014/080544, dated Aug. 23, 2016, 6 pages.
Office Action for JP Patent Application No. 2016-503940, dated Aug. 7, 2018, 05 pages of Office Action and 05 pages of English Translation.
Office Action for JP Patent Application No. 2016-503940 dated Nov. 13, 2018, 05 pages of Office Action and 05 pages of English Translation.
Office Action for JP Patent Application No. 2019-030787, dated Mar. 10, 2020, 07 pages of Office Action and 05 pages of English Translation.

* cited by examiner

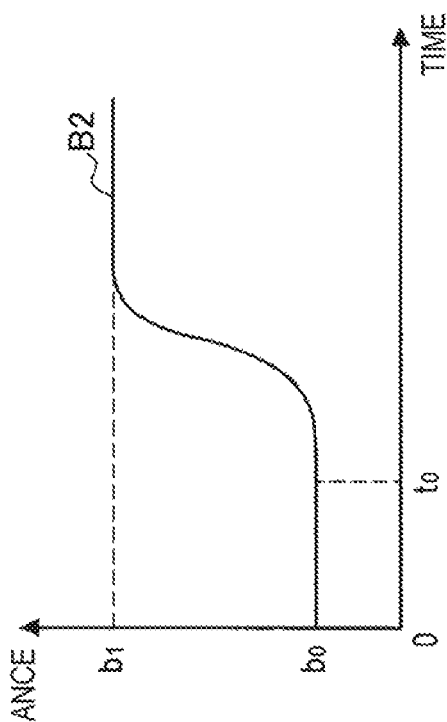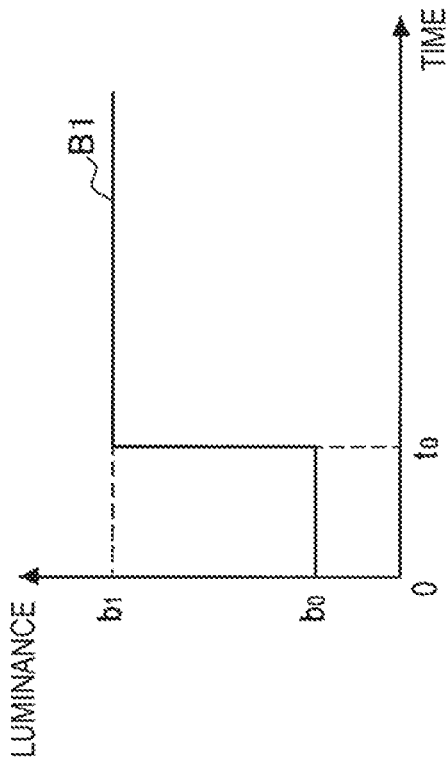
FIG. 7

ELECTRONIC APPARATUS AND METHOD OF PROVIDING IMAGE ON A WEARABLE OPTICAL DEVICE

CROSS REFERENCE TO RELATED APPLICATIONS

This application is a U.S. National Phase of International Patent Application No. PCT/JP2014/080544 filed on Nov. 18, 2014, which claims priority benefit of Japanese Patent Application No. 2014-031604 filed in the Japan Patent Office on Feb. 21, 2014. Each of the above-referenced applications is hereby incorporated herein by reference in its entirety.

TECHNICAL FIELD

The present disclosure relates to an electronic apparatus and a method of providing an image.

BACKGROUND ART

A various types of optical devices allowing a viewer to perceive a virtual image superimposed on an image in real space have been recently developed. An example of such optical devices includes a wearable optical device, and in particular, a device that is worn by the user on the head is known as a head-mounted display (HMD). An exemplary type of the HMD is known in which a half mirror serving as a display surface is provided in front of the viewer's pupils and an image (real image) is formed on the display surface. Another type of the HMD is developed in which guidance of image display light to the viewer's pupils using an optical system allows the viewer to perceive an image (virtual image). As one example, Patent Literature 1 discloses the technique that implements an HMD capable of guiding the image display light in the lateral direction with respect to the viewer's pupils to be incident on the viewer's pupils.

A technique for enhancing visibility of an image even if brightness of real space varies in the case where an image in a real space and a virtual image are viewed using such an HMD has been also developed. As one example, Patent Literature 2 discloses the technique that detects illuminance of the light passing through an optical system of the HMD from the front of the viewer's eyes and is guided to the viewer's eyes. In addition, this technique gradually decreases the luminance of image display light when illuminance changes from a bright region to a darker one, and gradually increases the luminance of image display light when illuminance changes from a dark region to a brighter one. This technique allows satisfactory visual recognition of an image to be achieved even when the illuminance of the light, which passes through an optical system from the front of the viewer's eyes and is guided to the viewer's eyes, is very low or high.

CITATION LIST

Patent Literature

Patent Literature 1: JP 4776285B
Patent Literature 2: JP 2011-175035A

SUMMARY OF INVENTION

Technical Problem

As one example, the use of the technique disclosed in Patent Literature 1 or other techniques leads to increasing reduction in size and weight of the wearable optical device such as HMD. Thus, such a wearable optical device is becoming popular in more various situations. Under such circumstances, the technique disclosed in Patent Literature 2 as an example is not necessarily a satisfactory solution in using a method of enhancing visibility of an image provided by the wearable optical device. In other words, it is desirable to provide a technology for enhancement of visibility of an image depending on various situations surrounding the viewer and the wearable optical device in addition to detection of a condition regarding whether the illuminance of light guided to the viewer's eyes is simply high or low.

Therefore, an embodiment of the present disclosure provides a novel and improved electronic apparatus and method of providing an image, capable of enhancing visibility of an image provided by a wearable optical device depending on different situations.

Solution to Problem

According to an embodiment of the present disclosure, there is provided an electronic apparatus including an illuminance information acquisition unit configured to acquire illuminance information indicating illuminance of light incident on a wearable optical device toward a viewer from a real space, a situation information acquisition unit configured to acquire situation information indicating a situation surrounding the wearable optical device, a luminance determination unit configured to determine luminance of light emitted by the wearable optical device to allow the viewer to perceive an image superimposed on the real space, the determination of luminance being performed on a basis of the illuminance information and the situation information, and a controller configured to control the wearable optical device to cause the wearable optical device to emit light having the determined luminance.

According to an embodiment of the present disclosure, there is provided a method of providing an image, including detecting illuminance of light incident on a wearable optical device toward a viewer from a real space, acquiring situation information indicating a situation surrounding the wearable optical device, determining luminance on a basis of the illuminance and the situation information, and emitting light having the determined luminance by the wearable optical device, the light being used to allow the viewer to perceive an image superimposed on the real space.

It is possible to enhance visibility of an image depending on different situations by causing situation information indicating a situation surrounding a wearable optical device to be incorporated into the luminance of light emitted from the wearable optical device for perception of the image.

Advantageous Effects of Invention

According to the embodiments of the present disclosure as described above, it is possible to enhance visibility of an image provided by the wearable optical device depending on different situations.

Note that the effects described above are not necessarily limited, and along with or instead of the effects, any advantageous effect set forth herein or other effects that can be expected from the present specification may be exhibited.

BRIEF DESCRIPTION OF DRAWINGS

FIG. 7 is a diagram showing an example of smoothing luminance values in the first embodiment of the present disclosure.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. First Embodiment
1-1. System Configuration
1-2. Luminance Control of Image Display Light
2. Second Embodiment
3. Third Embodiment
4. Fourth Embodiment
5. Hardware Configuration
6. Supplement

1. FIRST EMBODIMENT (1-1. System Configuration)

Figure 1:
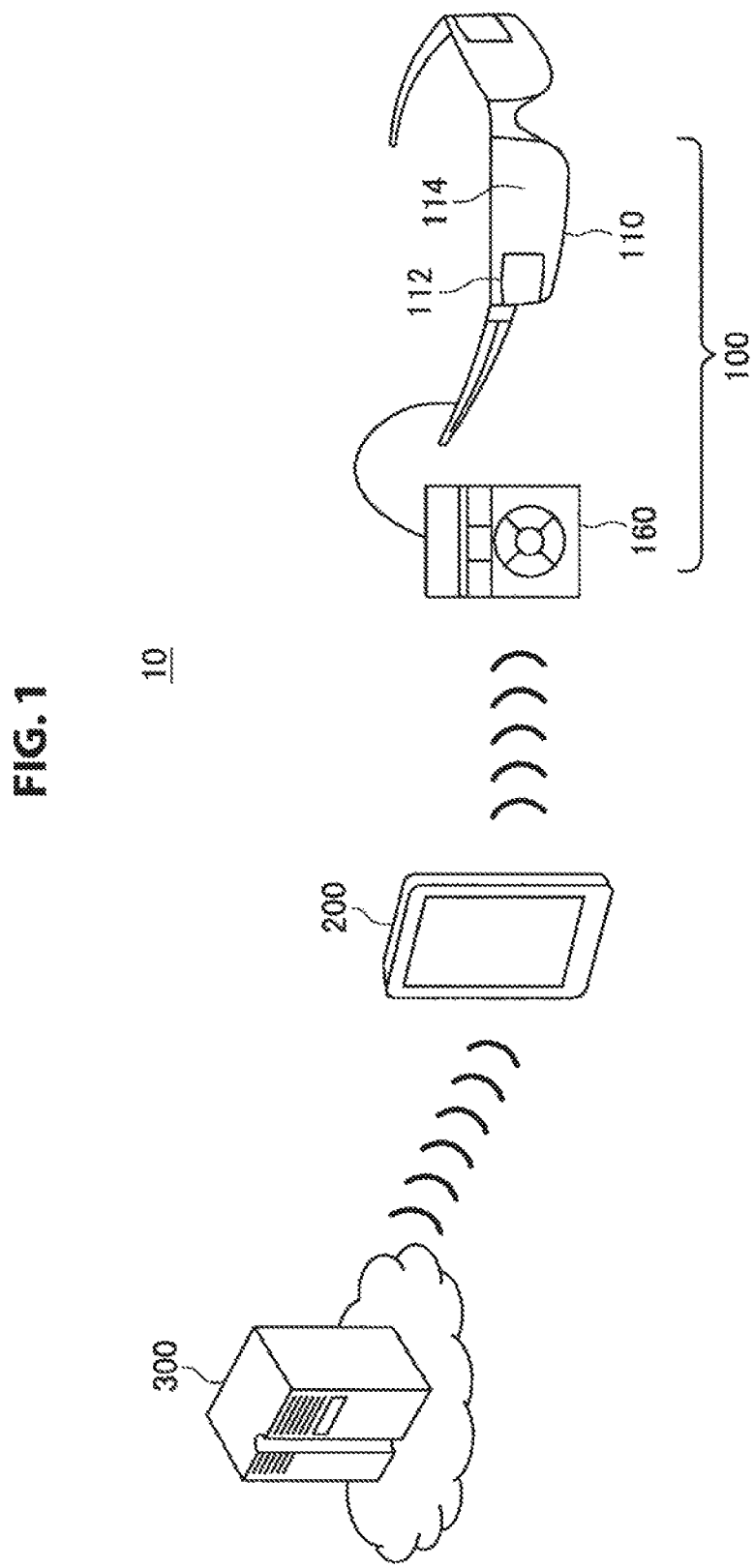
FIG. 1 is a diagram showing a schematic configuration of a system according to a first embodiment of the present disclosure.
Figure 2:
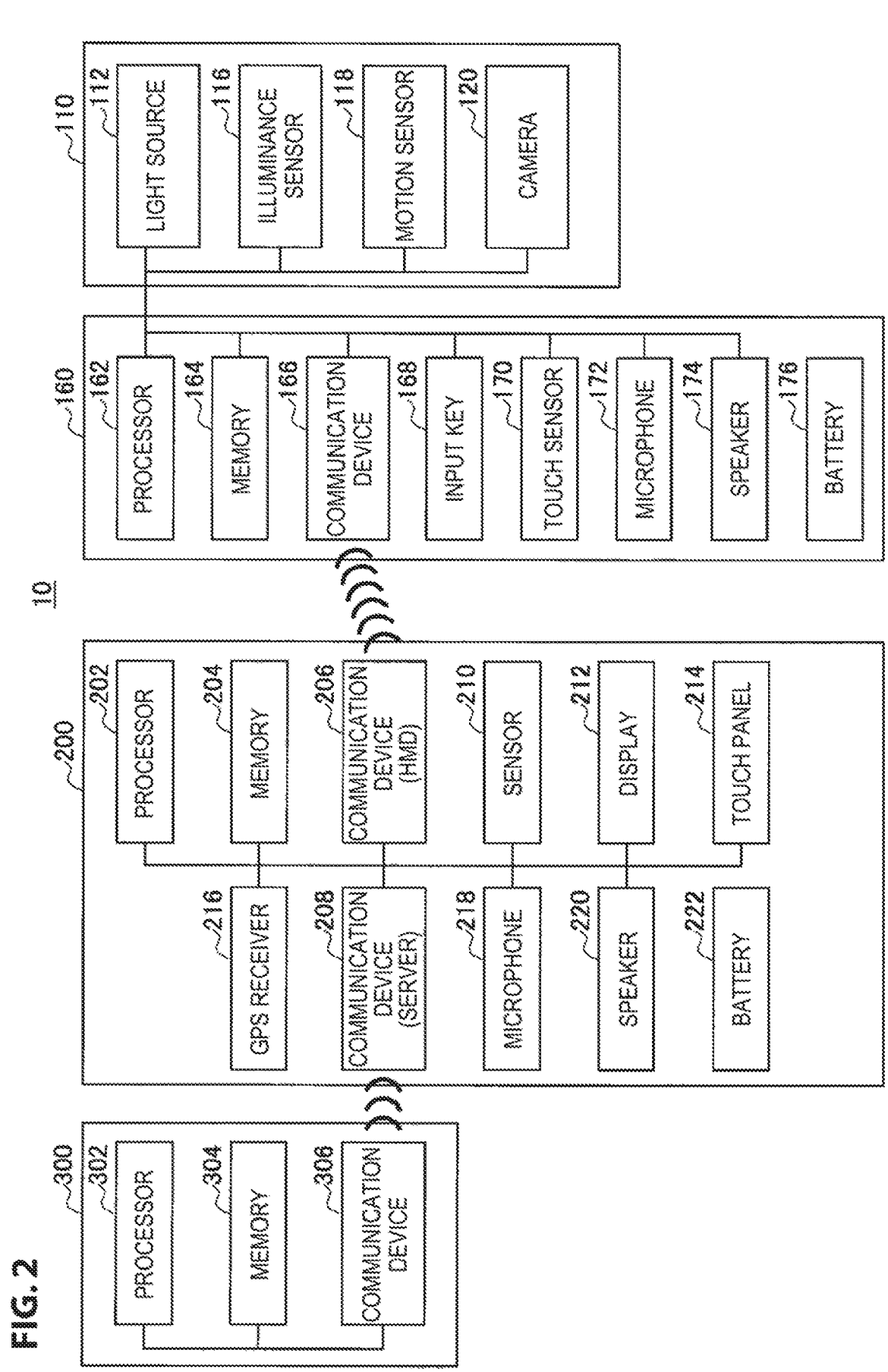
FIG. 2 is a block diagram showing a schematic functional configuration of the system shown in FIG. 1.

FIG. 1 is a diagram showing a schematic configuration of a system according to a first embodiment of the present disclosure. FIG. 2 is a block diagram showing a schematic functional configuration of the system shown in FIG. 1. Referring to FIGS. 1 and 2, the system 10 includes a head-mounted display (HMD) 100, a smartphone 200, and a server 300. Hereinbelow, configurations of the respective devices will be described.

(Head-Mounted Display)

The HMD 100 includes a display unit 110 and a control unit 160. The display unit 110 has a housing in the shape of, for example, glasses, and is worn by a user (observer) on his or her head. The control unit 160 is connected to the display unit 110 by a cable.

The display unit 110 is provided with a light source 112 and a light guide plate 114 as shown in FIG. 1. The light source 112 emits image display light according to control of the control unit 160. The light guide plate 114 guides the image display light incident from the light source 112, and then emits the image display light to a position corresponding to the eyes of the user. The eyes of the user receive incidence of light that is incident on the light guide plate 114 from a real space and is then transmitted through the light guide plate 114, and the image display light guided from the light source 112 by the light guide plate 114. Accordingly, the user wearing the display unit 110 can perceive an image being superimposed on the real space. Note that, for the configuration for causing the image display light to be emitted from the light source 112 through the light guide plate 114, for example, the technology disclosed in JP4776285B described above may be used. The display unit 110 may be further provided with an optical system that is not illustrated for the configuration.

Furthermore, the display unit 110 is configured to include an illuminance sensor 116, a motion sensor 118, and a camera 120, as shown in FIG. 2. The illuminance sensor 116 detects the illuminance of light that is incident on the display unit 110 toward the user (viewer) from the real space. As described later, illuminance information output from the illuminance sensor is used to control the luminance of image display light omitted from the light source 112. Thus, the illuminance sensor 116 may have directivity to detect the illuminance of an area corresponding to the user's field of view in the real space. The motion sensor 118 includes, for example, a triaxial acceleration sensor, a triaxial gyro sensor, and a triaxial geomagnetic sensor. Based on acceleration, an angular velocity, and a direction of the display unit 110 detected by the sensors, an attitude and a motion (displacement and rotation) of the display unit 110 can be specified. When the display unit 110 is worn on the user's head, the attitude and movement of the display unit 110 may be considered to be the attitude and movement of the user's head. The camera 120 captures an image of the real space. The image captured by the camera 120 is treated as an image corresponding to the user's field of view in the real space, as one example.

The control unit 160 is configured to include a processor 162, a memory 164, a communication device 166, an input key 168, a touch sensor 170, a microphone 172, a speaker 174, and a battery 176. The processor 162 operates in accordance with a program stored in the memory 164 to implement various functions. In one example, the processor 162 implements functions of an illuminance information acquisition unit, a luminance determination unit, and a controller, which will be described later. The processor 162 transmits a control signal to the display unit 110 over wire communication through a cable and controls emission of the image display light from the light source 112. The processor 162 acquires data output from the illuminance sensor 116, the motion sensor 118, and the camera 120 included in the display unit 110, and executes a process on the basis of the acquired data.

The memory 164 stores various kinds of data for operations of the processor 162. For example, the memory 164 stores programs for the processor 162 to realize various functions. In addition, the memory 164 temporarily stores data output from the illuminance sensor 116, the motion sensor 118 and the camera 120 of the display unit 110. The communication device 166 executes wireless communication with the smartphone 200. For the wireless communication, for example, Bluetooth (a registered trademark), Wi-Fi, or the like is used. The input key 168 includes, for example, a return key, a Push-to-Talk (PTT) key, and the like, and acquires user operations with respect to the HMD 100. The touch sensor 170 likewise acquires user operations with respect to the HMD 100. To be more specific, the touch sensor 170 acquires, for example, operations such as tapping, swiping and the like performed by a user.

The microphone 172 converts sound into an audio signal and provides it to the processor 162. The speaker 174 outputs sound under control of the processor 162. The battery 176 supplies power to the entire components of the control unit 160 and the display unit 110. Note that a small size and light weight of the display unit 110 are intended in the HMD 100 such that the processor 162, the microphone 172, the speaker 174, the battery 176, and the like can be mounted in the control unit 160, and the display unit 110 and the control unit 160 are separated from each other, but connected with a cable. Since the control unit 160 is also carried by a user, it is desirable that it be as small and light as possible. Thus, by setting the functions realized by the processor 162 as minimum functions for controlling the display unit 110 and other functions to be realized by the smartphone 200, for example, a small size of the entire control unit 160 and battery 176 attributable to a reduction in power consumption of the processor 162 may also be attempted.

(Smartphone)

The smartphone 200 is provided with a processor 202, a memory 204, communication devices 206 and 208, a sensor 210, a display 212, a touch panel 214, a Global Positioning System (GPS) receiver 216, a microphone 218, a speaker 220, and a battery 222. The processor 202 realizes various functions as it operates according to programs stored in the memory 204. As described above, as the processor 202 realizes various functions in cooperation with the processor 162 provided in the control unit 160 of the HMD 100, the control unit 160 can be small. The memory 204 stores various kinds of data for operations of the smartphone 200. For example, the memory 204 stores programs for the processor 202 to realize the various functions. In addition, the memory 204 temporarily or permanently stores data acquired by the sensor 210 and the GPS receiver 216 and data transmitted to and received from the HMD 100.

The communication device 206 executes wireless communication using Bluetooth (a registered trademark), Wi-Fi, or the like with the communication device 166 provided in the control unit 160 of the HMD 100. In addition, the communication device 208 executes network communication with the server 300. The network communication may be executed via, for example, a mobile telephone network. The display 212 displays various images according to control of the processor 202. The touch panel 214 is disposed on the display 212, and acquires touch operations of the user with respect to the display 212. The GPS receiver 216 receives GPS signals for measuring latitude, longitude, and altitude of the smartphone 200. The microphone 218 converts sounds into audio signals, and then provides the signals to the processor 202. The speaker 220 outputs sounds according to control of the processor 202. The battery 222 supplies power to the entire smartphone 200.

(Server)

The server 300 is provided with a processor 302, a memory 304, and a communication device 306. Note that the server 300 is realized, for example, through cooperation between a plurality of server devices on a network; however, it will be described as a virtual single device herein for simplification of description. The processor 302 realizes various functions as it operates according to programs stored in the memory 304. The processor 302 of the server 300 executes various information processes according to, for example, requests received from the smartphone 200, and transmits results thereof to the smartphone 200. The memory 304 stores various kinds of data for operations of the server 300. For example, the memory 304 stores programs for the processor 302 to realize the various functions. Further, the memory 304 may temporarily or continuously store data uploaded from the smartphone 200. The communication device 306 executes network communication via, for example, a mobile telephone network with the smartphone 200.

Hereinabove, the system configuration according to the first embodiment of the present disclosure has been described. Note that, in the present embodiment, the HMD 100 is an example of an electronic apparatus, including the wearable optical device (display unit 110). As described above, the HMD 100 makes an observer perceive images by guiding image display light to the eyes of the observer using the light guide plate 114. Thus, although the term "display" is used, the HMD 100 is not necessarily a device that causes images to be formed on its display plane. Of course, an HMD of another known type such as a type of HMD in which images are formed on its display plane may be used instead of the HMD 100. In this case, the image display light may be projected onto the display surface (in case of a projector), may be emitted by a light-emitting device arranged on the display surface (in case of an organic EL display), or may be one that is emitted from the light source arranged on the back or side of the display surface and is modulated on the display surface (in case of a liquid crystal display). In any case, the image display light having predetermined luminance is emitted from the display unit 110. The predetermined luminance is determined by the processor 162 included in the example control unit 160, as an example. The term "emission" as used herein denotes that a light source emits light to a light guide plate or a display surface, as the examples described above. In other words, the term "emission" does not necessarily denote that the light emitted from a light source is directed to the outside of the wearable optical device.

In addition, the system configuration described above is an example, and various other system configurations are also possible. For example, the HMD 100 may not necessarily have the display unit 110 and the control unit 160 separated from each other, and the entire configuration of the HMD 100 described above may be consolidated in a glasses-type housing such as the display unit 110. In addition, as described above, at least some of the functions for controlling the HMD 100 may be realized by the smartphone 200. Alternatively, the display unit 110 may also be provided with a processor and thus information processing of the HMD 100 may be realized in cooperation between the processor 162 of the control unit 160 and the processor of the display unit 110.

As another modified example, the system 10 may not include the smartphone 200, and communication may be directly executed between the HMD 100, and the server 300. In addition, in the system 10, the smartphone 200 may be replaced by another device that can execute communication with both of the HMD 100 and the server 300, for example, a tablet terminal, a personal computer, a portable game device, or the like.

Figure 3:
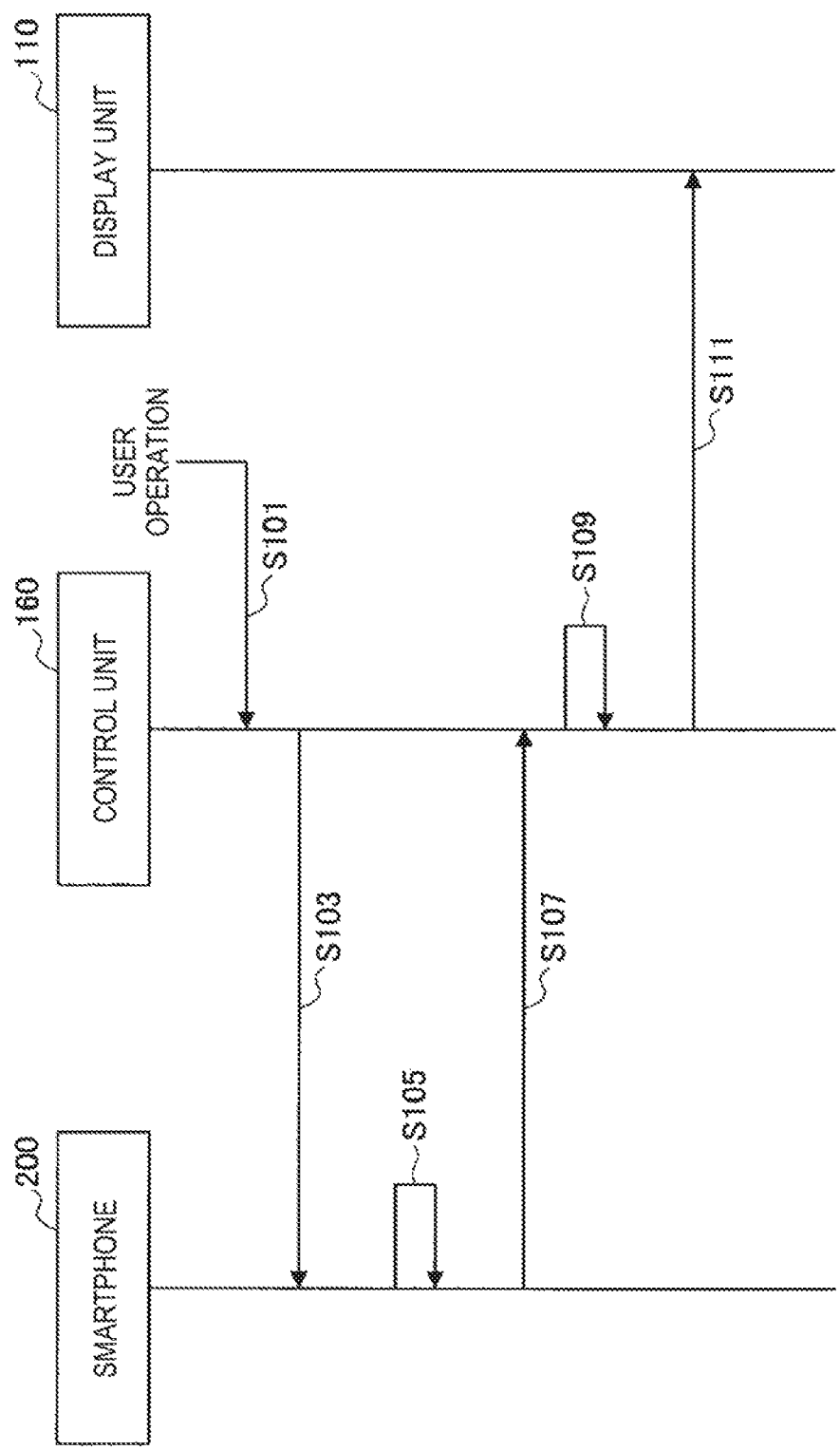
FIG. 3 is a diagram showing an example of the sequence of processes of the system according to the first embodiment of the present disclosure.

FIG. 3 is a diagram showing an example of the sequence of processes of the system according to the first embodiment of the present disclosure. Referring to FIG. 3, first, a user operation is input to the control unit 160 of the HMD 100 via the touch sensor 170 (S101). At that time, the processor 162 transmits information indicating the content of the user operation to the smartphone 200 using the communication device 166 (S103). The processor 202 of the smartphone 200 determines the content of an image to be displayed next based on the information from the HMD 100 received through the communication device 206 (S105). Although not illustrated, the processor 202 may communicate with the server 300 at that time using the communication device 208 to acquire information necessary for the image to be displayed next.

Next, the processor 202 transmits the information necessary for the image to be displayed next, for example, an icon, text, or the like, to the HMD 100 using the communication device 206 (S107). The processor 162 of the HMD 100 generates the image to be displayed next (frame image) based on the information from the smartphone 200 received through the communication device 166 (S109). Further, the processor 162 controls the light source 112 of the display unit 110 based on data of the generated frame image, and thereby updates a frame of an image provided with image display light emitted from the light source 112 (S111).

(1-2. Luminance Control of Image Display Light)

Figure 4:
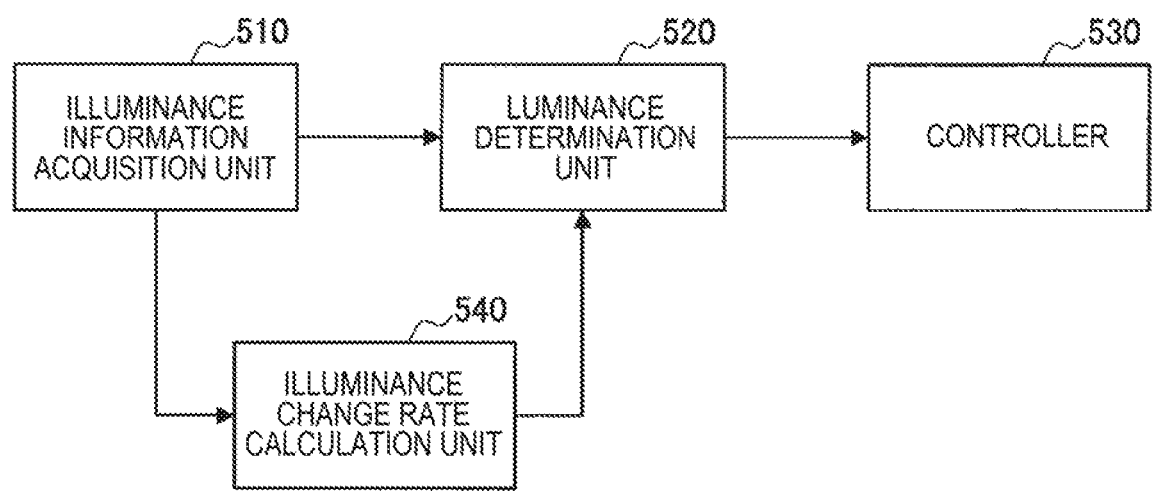
FIG. 4 is a block diagram showing a functional configuration for controlling the luminance of image display light in the first embodiment of the present disclosure.

FIG. 4 is a block diagram showing a functional configuration for controlling the luminance of image display light in the first embodiment of the present disclosure. Referring to FIG. 4, in the present embodiment, the luminance control of the image display light is implemented by the functional configuration including an illuminance information acquisition unit 510, a luminance determination unit 520, a controller 530, and an illuminance change rate calculation unit 540.

As described above, in the system 10, these functional components are implemented by allowing the processor 162 included in the control unit 160 of the HMD 100 to be executed in accordance with the program stored in the memory 164. Alternatively, some or all of the functional components may be implemented by allowing the processor 202 of the smartphone 200 communicating with the HMD through wireless communication such as Bluetooth (registered trademark) and Wi-Fi to be executed in accordance with the program stored in the memory 204. Similarly, some or all of the functional components may be implemented by allowing the processor 302 of the server 300 to be executed in accordance with the program stored in the memory 304. In other words, the functional components may be implemented in any electronic apparatus (HMD 100, smartphone 200, or server 300) included in the system 10 or may be implemented by a plurality of electronic apparatuses included in the system 10 in cooperation with each other.

(Primary Luminance Control)

A primary luminance control is first described. As a primary luminance control in the present embodiment, the luminance of the luminance determination unit 520 is determined on the basis of the illuminance indicated by illuminance information acquired by the illuminance information acquisition unit 510. The controller 530 controls the light source 112 so that the light source 112 emits image display light having the determined luminance.

The illuminance information acquisition unit 510 acquires illuminance information indicating the illuminance of the light that is incident on the display unit 110 (more specifically, a position corresponding to the user's eye on the light guide plate 114) toward the viewer from the real space. The display unit 110 is an example of the wearable optical device in the present embodiment. The illuminance information is acquired by the illuminance sensor 116 included in the display unit 110. As described above, the illuminance sensor 116 may have directivity to detect the illuminance of an area corresponding to the user's field of view in the real space.

Figure 5:
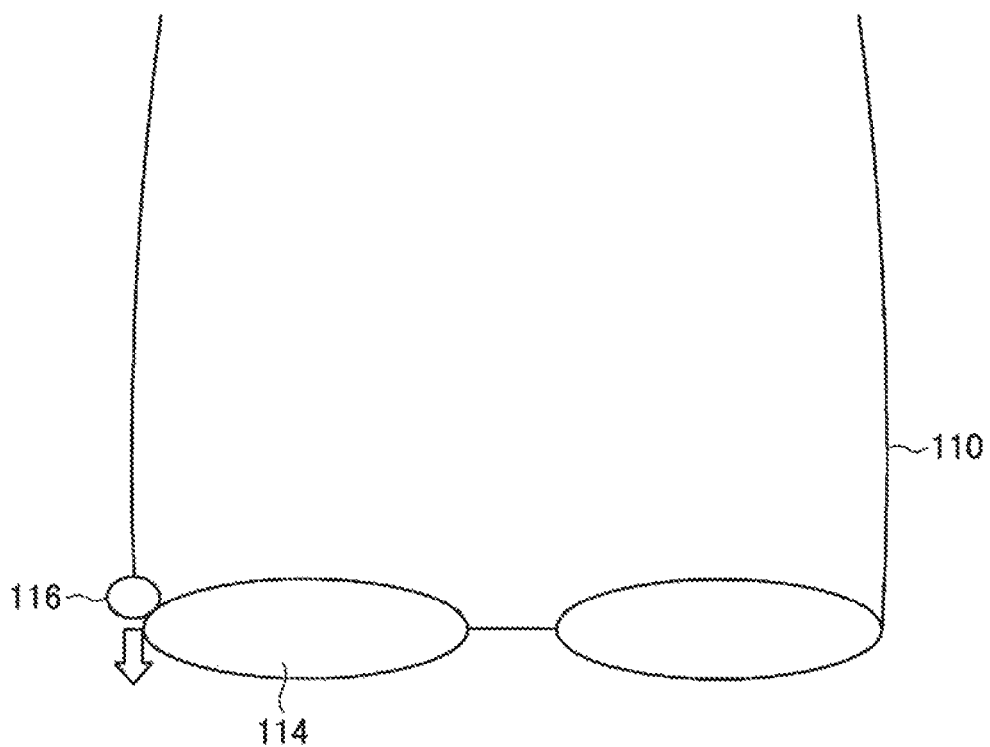
FIG. 5 is a diagram showing an example of an attachment position of an illuminance sensor in the first embodiment of the present disclosure.

In this connection, FIG. 5 illustrates an example of a position to which the illuminance sensor 116 is attached. In the example shown in FIG. 5, the illuminance sensor 116 is attached to face forward in the front of the display unit 110. The facing forward in the front of the display unit 110 coincides with the direction in which the user recognizes visually the real space through the light guide plate 114. Furthermore, the illuminance sensor 116 may have directivity of the facing forward in the front of the display unit 110 (corresponding to the arrow shown in FIG. 5) to detect the illuminance of an area corresponding to the user's field of view in the real space.

The description is continued referring back to FIG. 4. The luminance determination unit 520 determines the luminance of the light emitted by the display unit 110 (more specifically, the light source 112), which is used to allow the user (viewer) to perceive an image superimposed on the real space, that is, the luminance of the image display light, on the basis of the illuminance information acquired by the illuminance information acquisition unit 510. The luminance determination unit 520 converts the illuminance indicated by the illuminance information into the luminance of the image display light using a step function, as an example. In the step function, a step is formed along a predetermined slope so that luminance increases as illuminance is high (bright) and luminance decreases as illuminance is low (dark), as shown in example described later. This makes it possible to emit the image display light having high luminance when the user's field of view in the real space appears bright, thereby maintaining the image visibility. It is also possible to emit the image display light having low luminance when the user's field of view in the real space appears dark, thereby preventing the real space of the background from being difficult to be viewed because an image exhibits excessive brightness.

Figure 6:
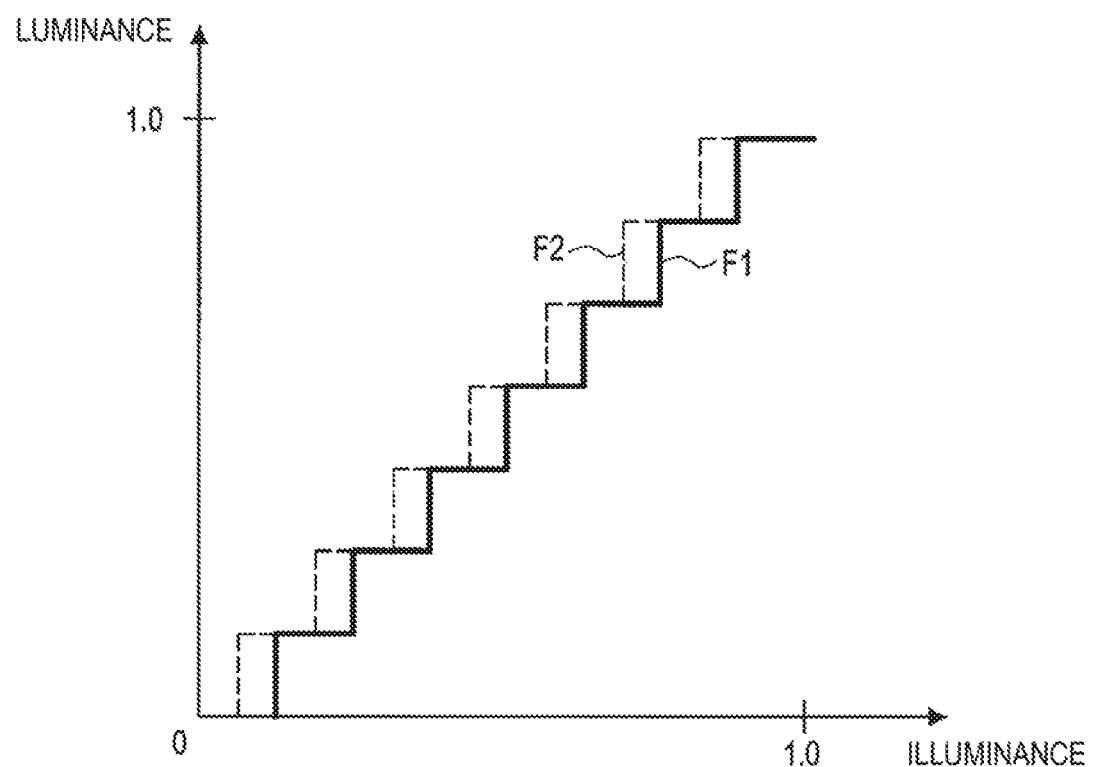
FIG. 6 is a diagram showing an example of a function used in the first embodiment of the present disclosure.

FIG. 6 illustrates an example of the step function used by the luminance determination unit 520 to convert the illuminance into the luminance of the image display light. In the example shown in FIG. 6, the illuminance is converted into the luminance using step functions F1 and F2. The luminance determination unit 520 uses the step function F1 (a first step function) when the illuminance indicated by the illuminance information increases. The luminance determination unit 520 uses the step function F2 (a second step function) when the illuminance indicated by the illuminance information decreases. The step function F2 is obtained by offsetting the step function F1 in the negative direction of the illuminance. In the graph shown in FIG. 6, the illuminance (input value) and the luminance (output value) are represented by normalizing their respective maximum values to 1.0.

Even when the luminance of the image display light corresponds to the illuminance in the real space, a change in luminance linearly with a minute change in illuminance does not necessarily enhance the image visibility. Thus, the conversion from illuminance into luminance using the step functions F1 and F2 as the above example makes it possible to keep the luminance constant against a minute change in illuminance, but to change the luminance with respect to the change in illuminance when a significant change in illuminance occurs. Moreover, the step function F1 is used when the illuminance increases, and the step function F2 is used when the illuminance decreases, thereby implementing so-called hysteresis control. As one example, it is assumed that in the case where the increasing illuminance exceeds a boundary value of the step function F1 and the luminance begins to decrease immediately after the luminance increases by a single step of the function. In this case, the luminance determination unit 520 switches a function to be used from the step function F1 to the step function F2 at the time when the illuminance begins to decrease. The step function F2 is obtained by offsetting the step function F1 in the negative direction of the illuminance, and thus the step function F2 has a boundary value of the illuminance with respect to the same output luminance value, which is lower than that of the step function F1. Accordingly, the luminance does not decrease immediately after the illuminance begins to decrease, that is, the luminance decreases from the time when the illuminance is lower than the boundary value of the step function F2 with respect to the luminance. Such control makes it possible to prevent output fluctuations such as chattering that occurs when the illuminance fluctuates up and down near the boundary value of the step function.

Furthermore, the luminance determination unit 520 may smooth the luminance obtained using the step function as shown in FIG. 6. This smoothing may be performed using a low-pass filter, as an example. FIG. 7 illustrates an example of the smoothing using a low-pass filter. In the example shown in FIG. 7, the luminance B1 obtained using the step function is smoothed by passing through the low-pass filter and is output as the luminance B2. This smoothes the time variation in the luminance, thereby reducing uncomfortable feeling of the user due to a rapid change in luminance. Thus, it is possible for the user to continue to recognize visually both the real space and the image without any distraction even when the luminance changes with the change in illuminance.

In the present embodiment, the determination of the luminance of the image display light by the luminance determination unit 520 performing the process as described above allows minute fluctuations or rapid change in luminance to hardly occur, thereby enhancing visibility of the image provided by the HMD 100. However, the process described above causes the change in luminance of the image display light to be delayed as compared to the change in illuminance of the light incident from the real space, which will be described later. Thus, a problem is likely to occur depending on situations surrounding the HMD 100.

For example, in the case where the conversion from illuminance into luminance using the step function as shown in FIG. 6 is performed, even when the illuminance indicated by the illuminance information decreases, the luminance does not decrease until the illuminance reaches a boundary value of the step function F2. At this time, the change in luminance is delayed as compared to the change in illuminance. In addition, when the change in luminance is smoothed using the low-pass filter as shown in FIG. 7, the luminance B1 before the smoothing rises instantaneously from $b_0$ to $b_1$ at time $t_0$, while the luminance B2 increases gradually from $b_0$ to $b_1$ from time $t_0$. Thus, the change in the luminance B2 is delayed as compared to the change in the luminance B1, and is delayed as compared to the change in the illuminance corresponding to the luminance B1. The example of FIG. 7 illustrates the case where the luminance B1 increases, but this is similarly applied to the case where the luminance B1 decreases.

In this description, as one example, it is assumed that in the case where the periphery of the HMD 100 becomes dark suddenly (when the illuminance decreases significantly in a short time). When the luminance of the image display light emitted from the display unit 110 is excessively high as compared to the illuminance of the field of view of the real space, the real space of the background is difficult to be viewed. Thus, the luminance is necessary to decrease as quickly as possible for the sake of safety. However, in the primary luminance control by the luminance determination unit 520 as described above, the change in luminance is delayed with respect to the change in illuminance as much as a rapid fluctuation in luminance are prevented. Thus, even though the periphery is dark, the state in which the luminance of the image display light remains high continues although it lasts in a short time. Accordingly, the real space of the background will be difficult to be viewed temporarily.

In the present embodiment, the luminance determination unit 520, which executes the control based on the situation information indicating a situation surrounding the HMD 100 in addition to the primary luminance control described above, makes it possible to prevent the occurrence of events as described above. The luminance control based on the situation information executed in conjunction with the above-described primary luminance control will be described in detail with reference again to FIG. 4.

(Luminance Control Based on Situation Information)

The illuminance change rate calculation unit 540 calculates a rate of change in illuminance on the basis of the illuminance information acquired by the illuminance information acquisition unit 510. In the present embodiment, information indicating the rate of change in illuminance is an example of the situation information indicating a situation surrounding the display unit 110 (wearable optical device). Thus, the illuminance change rate calculation unit 540 can be understood to serve as a situation information acquisition unit that is configured to acquire the situation information. More specifically, as one example, the illuminance change rate calculation unit 540 calculates the rate of change by smoothing the illuminance indicated by the illuminance information using a low-pass filter and by differentiating the smoothed illuminance. The information indicating the calculated rate of change is provided to the luminance determination unit 520. When the luminance is rapidly decreased by the rate of change, the luminance determination unit 520 sets the luminance to be output to the minimum value (e.g., zero) with uniformity regardless of the luminance obtained by the process using the step function described above. When the luminance is set to the minimum value, the controller 530 turns the light source 112 of the display unit 110 off, as an example. This makes it possible to decrease rapidly the luminance by minimizing the delay when the periphery of the HMD 100 becomes dark suddenly (when the illuminance decreases significantly in a short time), and thus it is possible to provide an enhanced field of view of the real space, thereby making the user safe.

Figure 8:
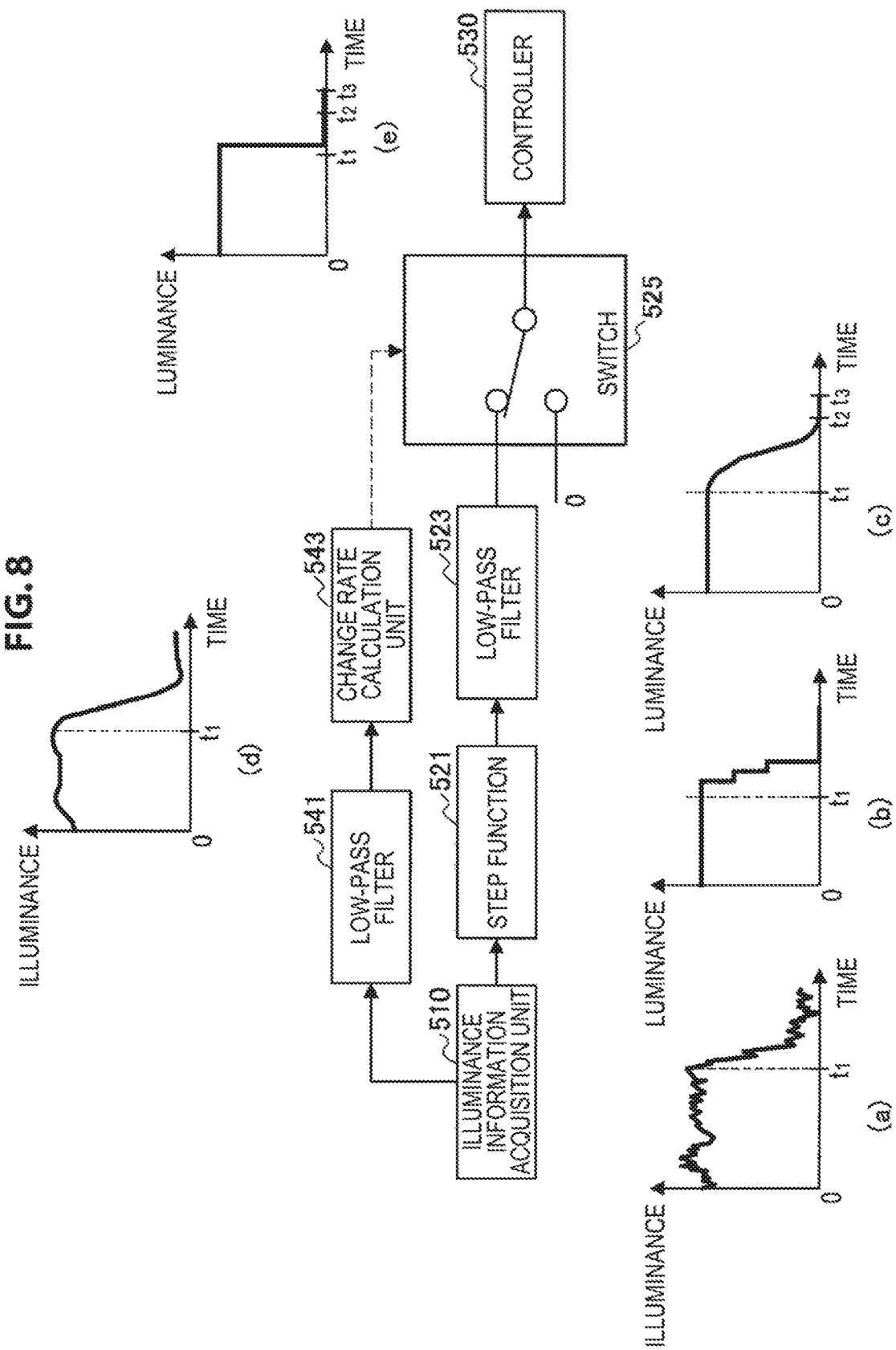
FIG. 8 is a diagram illustrated to describe a process in the first embodiment of the present disclosure.

FIG. 8 is a diagram illustrated to describe in more detail an example of the waveform of illuminance and luminance in conjunction with the process described above. In FIG. 8, the process performed by the luminance determination unit 520 is implemented as a step function 521, a low-pass filter 523, and a switch 525, and the process performed by the illuminance change rate calculation unit 540 is implemented as a low-pass filter 541 and a change rate calculation unit 543.

As one example, the illuminance information acquisition unit 510 is assumed to acquire illuminance information indicating a change in illuminance having a waveform shown in the portion (a). In the waveform shown in the portion (a), the luminance decreases rapidly and significantly from time $t_1$. In this case, in the primary process by the luminance determination unit 520, the luminance having a stepped waveform shown in the portion (b) is obtained by the conversion performed by the step function 521. Then, the low-pass filter 523 smoothes the obtained luminance into a waveform shown in the portion (c). In the smoothed luminance having the waveform shown in the portion (c), the luminance decreases over the time interval from time $t_1$ at which the luminance having the waveform shown in the portion (a) begins to decrease to time $t_2$.

On the other hand, in the process by the illuminance change rate calculation unit 540, the change rate calculation unit 543 calculates a rate of change in illuminance by differentiating a waveform of the portion (d) obtained by the low-pass filter 541 that removes high-frequency noise from the waveform shown in the portion (a). When the resulting rate of change in illuminance, that is, the slope of the waveform shown in the portion (d) after time $t_1$ is negative (illuminance is decreased) and the absolute value of the slope exceeds a threshold (illuminance changes rapidly), the luminance determination unit 520 selects a control process for setting the luminance to zero (minimum value) with uniformity rather than the luminance control in accordance with the waveform shown in the portion (c) obtained by the step function 512 and the low-pass filter 523 using the switch 525. At this point, the controller 530 turns the light source 112 of the display unit 110 off to set the luminance of the image display light to zero. Accordingly, the luminance of the image display light becomes zero at a time earlier than time $t_2$ as shown in the waveform of the portion (e).

Moreover, the luminance determination unit 520 may return the process to the luminance control in accordance with the waveform shown in the portion (c) obtained by the step function 521 and the low-pass filter 523 at time t3 from the lapse of a predetermined time after the operation by the switch 525 described above. The predetermined time taken from the time t3 may be a time until the luminance becomes zero after the change in illuminance is incorporated into the waveform shown in the portion (c) obtained by the step function 521 and the low-pass filter 523, or may be the longer time. Returning the process to the luminance control makes it possible to resume the luminance control corresponding to the illuminance smoothly, for example, when the illuminance increases again.

Figure 9:
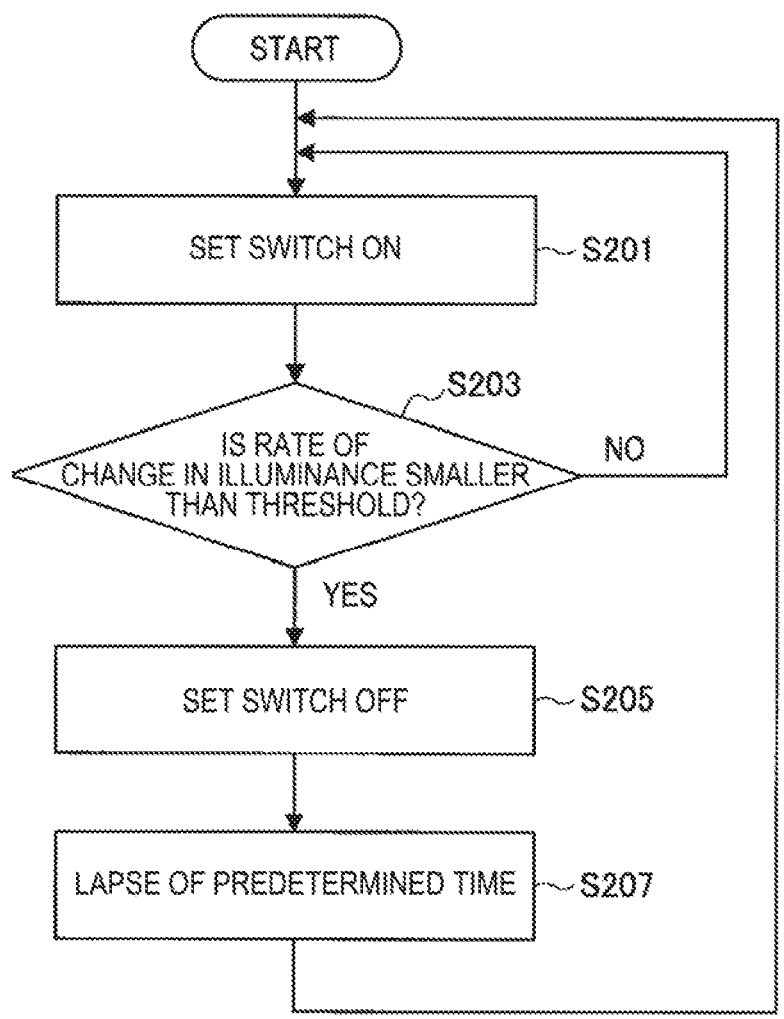
FIG. 9 is a flowchart showing an example of the operation of a switch shown in FIG. 8.

FIG. 9 is a flowchart showing an example of the operation by the switch 525 shown in FIG. 8. Referring to FIG. 9, in normal case, the switch 525 is turned on, that is, the luminance obtained by the step function 521 and the low-pass filter 523 is set to be transmitted to the controller 530 (S201). Then, if the rate of change in illuminance calculated by the change rate calculation unit 543 is smaller than a threshold (negative value) (YES in S203), the switch 525 is turned on, that is, the uniform luminance having a value of zero (minimum value) is set to be transmitted to the controller 530 (S205). Further, if a predetermined time is elapsed from step S203 (S207), the process returns to step S201.

In this way, in the present embodiment, a process of determining the luminance based on the illuminance information is selected from among a plurality of candidate processes (the process of converting illuminance into luminance using the step function 521 and the low-pass filter 523 and the process of setting the luminance to zero (minimum value) with uniformity regardless of the illuminance). This selection is performed on the basis of the situation information (the rate of change in illuminance indicated by the illuminance information) indicating a situation surrounding the display unit 110. Among the plurality of candidate processes, a first process (the process of converting illuminance into luminance using the step function 521 and the low-pass filter 523) involves a delay of the change in luminance with respect to the change in illuminance, which occurs by preventing rapid change in luminance. On the other hand, in a second process (the process of setting the luminance to zero (minimum value) with uniformity regardless of the illuminance), a rapid change in luminance is not prevented (rather it is set to be zero (minimum value) rapidly), thus no delay like the first process is involved. Strictly speaking, although delay is not zero even in the second process, this does not significantly affect the user's perception. The difference in purpose between the first process and the second process as described above allows the low-pass filter 523 and the low-pass filter 541 to employ respective filters having different characteristics. When it is shown that the illuminance decreases rapidly by the rate of change in the illuminance, the user's safety in the real space is secured by enhancing the user's field of view, thus the switch 525 included in the luminance determination unit 520 selects the second process that does not involve the delay. Otherwise, the switch 525 selects the first process.

As described above, in the present embodiment, the conversion from illuminance into luminance using the step function and the low-pass filter makes it possible to prevent fluctuations or rapid change in luminance, thereby enhancing visibility of an image provided by the image display light. Furthermore, in the present embodiment, the use of information indicating the rate of change in illuminance indicated by the illuminance information as the situation information indicating a situation surrounding the HMD 100 makes it possible to interrupt execution of the process of preventing fluctuations or rapid change in luminance when the periphery of the HMD 100 becomes dark suddenly, thereby reducing rapidly the luminance of the image display light depending on the illuminance. Thus, in the present embodiment, it is possible to enhance visibility of the image provided by the HMD 100 while securing the user's safety when the periphery becomes dark suddenly.

2. SECOND EMBODIMENT

A second embodiment of the present disclosure is described. In the second embodiment, a system 10 that is similar to that of the first embodiment executes a luminance control of the image display light, which is different from the first embodiment. Thus, the repeated description of the system configuration that is common to the first embodiment will be omitted, thus a process of the luminance control is mainly described.

Figure 10:
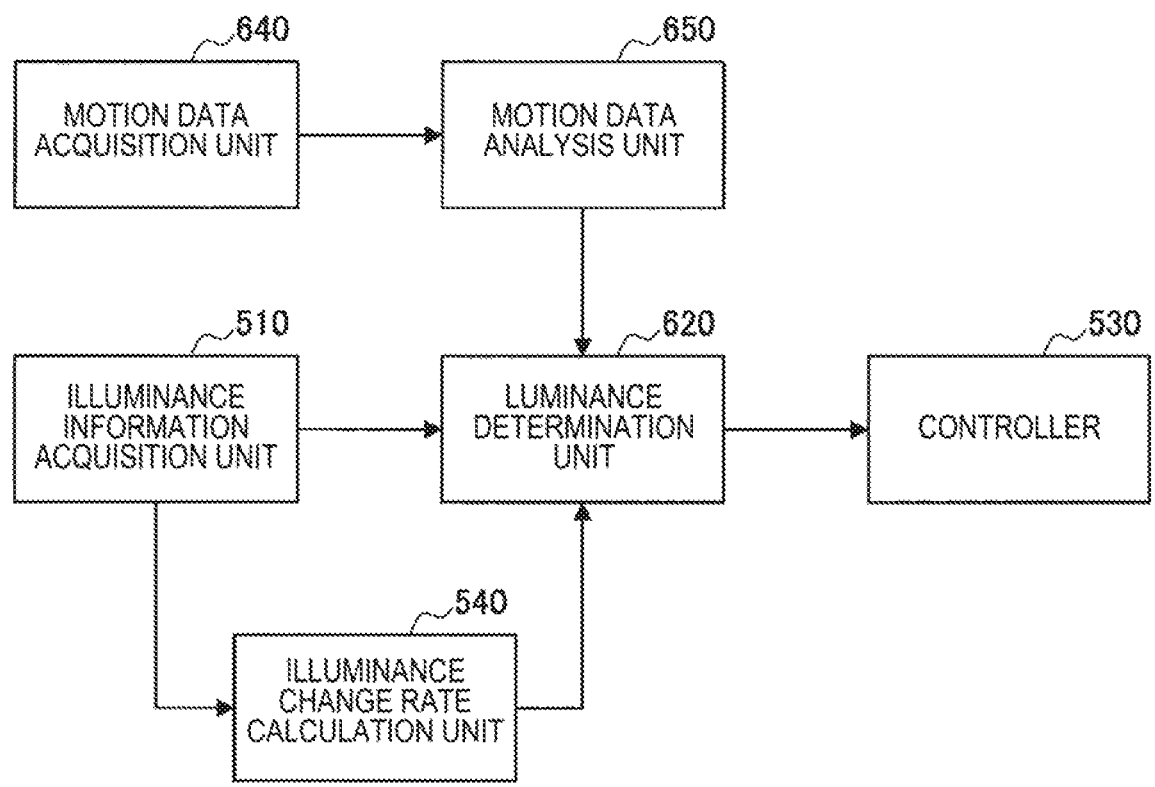
FIG. 10 is a block diagram showing a functional configuration for controlling the luminance of image display light in a second embodiment of the present disclosure.

FIG. 10 is a block diagram showing a functional configuration for controlling the luminance of image display light in the second embodiment of the present disclosure. Referring to FIG. 10, in the present embodiment, the luminance control of the image display light is implemented by the function configuration including an illuminance information acquisition unit 510, a luminance determination unit 620, a controller 530, an illuminance change rate calculation unit 540, a motion data acquisition unit 640, and a motion data analysis unit 650. These functional components are implemented, for example, by any of the processor 162 included in the control unit 160 of the HMD 100, the processor 202 of the smartphone 200, and the processor 302 of the server 300, or implemented in cooperation between them, which is similar to the first embodiment.

The illuminance information acquisition unit 510, the controller 530, and the illuminance change rate calculation unit 540 have the functional configuration similar to that of the first embodiment, and thus the repeated description will be omitted. In addition, the illuminance change rate calculation unit 540 may not be necessarily provided as long as the user's safety can be secured using other means when the periphery of the HMD 100 becomes dark suddenly. In the case where the illuminance change rate calculation unit 540 is provided, the luminance determination unit 620 performs an operation in a way similar to that performed by the luminance determination unit 520 according to the first embodiment when the illuminance change rate calculation unit 540 detects a rapid decrease in illuminance, and thus repeated description will be omitted.

The motion data acquisition unit 640 acquires an output value output from the motion sensor 118 (referred to as "motion data", hereinafter) included in the display unit 110. The display unit 110 including the motion sensor 118 is worn on the head of the user (viewer), and thus the motion data can be regarded as indicating the attitude or movement of the head of the user (viewer).

The motion data analysis unit 650 analyzes the motion data acquired by the motion data acquisition unit 640 to detect a motion of the user wearing the display unit 110. The process of detecting a motion of the user who is walking, running, standing, and sitting on the basis of the acceleration, angular velocity, and orientation contained in the motion data is a known technology disclosed in JP 2010-198595A or the like as one example, and thus the detailed description thereof will be omitted herein.

The motion data analysis unit 650 may detect a motion of the user, which is different from a normal motion such as walking, running, standing, and sitting, while using techniques as described above. As one example, the motion data analysis unit 650 may detect a motion that translates the range of real space included in the user's field of view, such as looking back, turning a corner while walking (running), looking down, and looking up. Such a motion can be specified by detecting the rotation of the user's neck or body on the basis of the output value from a gyro sensor, as an example.

In the present embodiment, information indicating the user's motion is an example of the situation information indicating a situation (situation of the user wearing the display unit 110) surrounding the display unit 110 (wearable optical device). Thus, the motion data analysis unit 650 can be understood to serve as a situation information acquisition unit configured to acquire the situation information.

The luminance determination unit 620 determines the luminance of the image display light, on the basis of the illuminance information acquired by the illuminance information acquisition unit 510 and the information indicating the user's motion provided by the motion data analysis unit 650. The luminance determination unit 620 converts the illuminance indicated by the illuminance information into the luminance of the image display light using the step function, as an example. Like the first embodiment, in the step function, a step is formed along a predetermined slope so that luminance increases as illuminance is high (bright) and luminance decreases as illuminance is low (dark).

Figure 11:
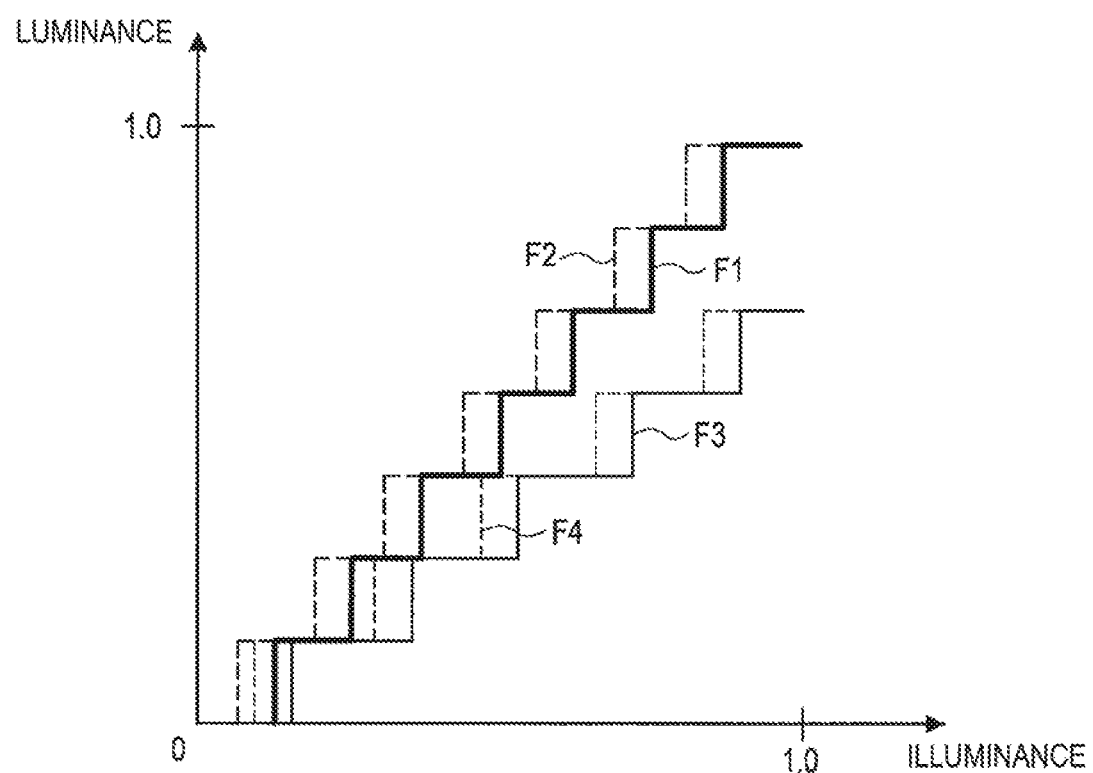
FIG. 11 is a diagram showing an example of a function used in the second embodiment of the present disclosure.

Furthermore, in the present embodiment, the luminance determination unit 620 selects a function to be used from among a plurality of candidate functions on the basis of the information indicating the user's motion. An example of the function selected in the present embodiment is illustrated in FIG. 11. In the example illustrated in FIG. 11, a function to be used in determining the luminance is selected from among step functions F1 and F2 and step functions F3 and F4. The step functions F1 and F2 are similar to those shown in FIG. 6. The step function F2 is obtained by offsetting the step function F1 in the negative direction of the illuminance. On the other hand, the step functions F3 and F4 are similar to the step functions F1 and F2 in terms of a set of step functions that are offset to each other but they have a slope forming a step, which is more gradual than the step functions F1 and F2. In other words, the step functions F3 and F4 convert the illuminance into the luminance at a ratio lower than those of the step functions F1 and F2. As one example, when the illuminance increases to the maximum value (1.0), the luminance in the step function F1 also increases to the maximum value (1.0), but the luminance in the step function F3 increases only up to approximately 70% of the maximum value. Thus, when the conversion from illuminance into luminance using the step functions F3 and F4 is performed, a luminance value being output becomes generally lower than that of the step functions F1 and F2. In the graph of FIG. 11, both illuminance (input value) and luminance (output value) are represented by normalizing their respective maximum values to 1.0.

In the above example, the luminance determination unit 620 selects any step functions among from the step functions F1 and F2 and the step functions F3 and F4 on the basis of the information indicating the user's motion. As one example, the luminance determination unit 620 selects the step functions F3 and F4 when the user is stationary, but the luminance determination unit 620 selects the step functions F1 and F2 when the user is walking or running. When the user is stationary, the real space of the background is fixed and thus an image is made easy to be visually recognized. Thus, the emission of the image display light having lower luminance using the step functions F3 and F4 makes it possible to provide an image that can be visually recognized without any obstruction. On the other hand, when the user is walking or running, the real space of the background changes and thus an image is made difficult to be visually recognized. The emission of the image display light having higher luminance using the step functions F1 and F2 makes it possible to provide an image that is easy to be visually recognized.

Moreover, if a motion that translates the range of real space included in the user's field of view, such as looking back, turning a corner while walking (running), looking down, and looking up is detected, the luminance determination unit 620 selects the step functions F3 and F4. Otherwise, the luminance determination unit 620 may select the step functions F1 and F2. When the range of the real space included in the field of view is translated, it is necessary to observe the state of the real space. Thus, the emission of the image display light having lower luminance by selecting the step functions F3 and F4 makes it possible for the user to easy to visually recognize the state of the real space.

Figure 12:
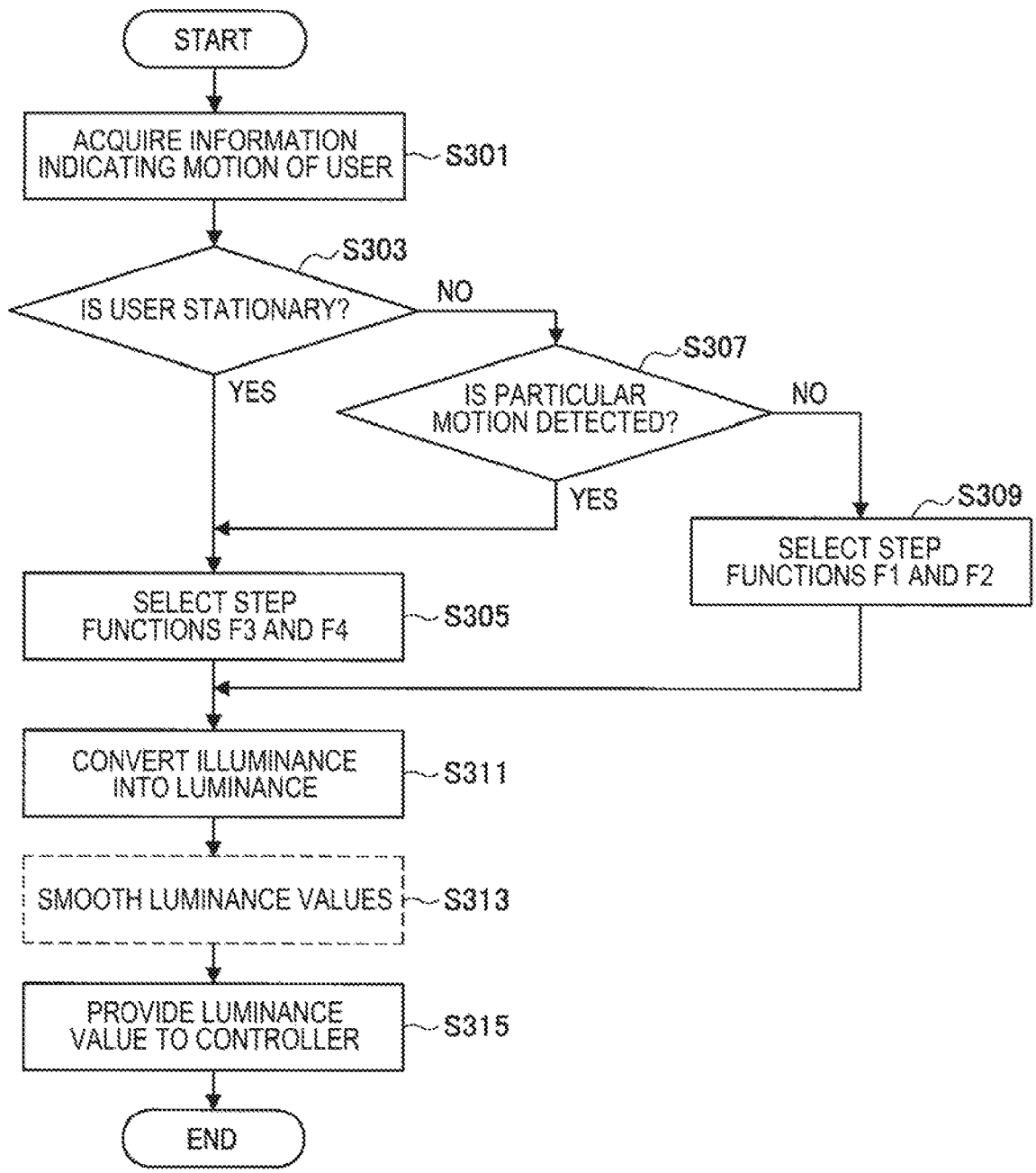
FIG. 12 is a flowchart showing an example of a process in the second embodiment of the present disclosure.

In the present embodiment, the luminance determination unit 620 may execute only either one of the above two determination processes or may execute a combination of both. An example of a process performed when both are combined is illustrated in the flowchart of FIG. 12. Referring to FIG. 12, if the luminance determination unit 620 acquires information indicating the user's motion (S301), the luminance determination unit 620 determines whether the user is stationary (S303). In this step, if the user is stationary (YES), the luminance determination unit 620 selects the step functions F3 and F4 (S305).

On the other hand, if it is not determined in step S303 that the user is stationary (NO), the user is assumed to keep moving by walking or running, as an example. In this case, furthermore, the luminance determination unit 620 determines whether a particular motion is detected (S307). The particular motion is a motion that translates the range of real space included in the user's field of view, such as looking back, turning a corner while walking (running), looking down, and looking up. If such a motion is detected (YES), the luminance determination unit 620 selects the step functions F3 and F4 (S305). On the other hand, if such a motion is not detected (NO), the luminance determination unit 620 selects the step functions F1 and F2 (S309). The selection of the step functions F1 and F2 allows an output luminance value, which is higher than that in the case where the step functions F3 and F4 are selected, to be obtained even if the input illuminance values are the same.

Then, the luminance determination unit 620 converts the input illuminance value (illuminance indicated by the illuminance information) into the output luminance value (luminance of the image display light) using the functions selected in steps S305 or S309 (S311), and provides the obtained luminance value to the controller 530 (S315). In this case, the luminance determination unit 620 may smooth the luminance values using a low-pass filter or the like (S313) as described in the first embodiment.

The process as described above determines the luminance of the image display light. Thus, as an example in which the illuminance of the real space is fixed, when the user stands still, an image is provided at slightly lower luminance, but when the user begins to walk, the luminance increases. Furthermore, when the user is looking back or turning a corner, the luminance decreases temporarily. Such a change in luminance makes it possible for the user to visually recognize the image to a satisfactory extent without obstruction due to excessive high luminance. In addition, such a change in luminance makes it possible to reduce the luminance of the image temporarily when the user wants to view clearly the state of the real space, and thus the real space is made easy to be visually recognized.

In this way, in the present embodiment, the process of determining the luminance based on the illuminance information is selected from among a plurality of candidate processes (the process using the step functions F1 and F2 and the process using the step functions F3 and F4), on the basis of the situation information indicating a situation surrounding the display unit 110 (information indication of the user's motion, which is generated on the basis of the value output from the motion sensor worn by the user (viewer)). Among the candidate processes, the second process (the process using the step functions F3 and F4) converts the illuminance indicated by the illuminance information into the luminance of the image display light at a ratio (second ratio) lower than that of the ratio of the first process (first ratio). The luminance determination unit 620 selects the second process when the user is stationary (when an image is easy to be visually recognized) or when a motion that translates the range of real space included in the user's field of view occurs (when the state of the real space is intended to be viewed clearly), otherwise selects the first process.

The second embodiment of the present disclosure described above may be implemented independently of the first embodiment or may be performed in combination with the first embodiment. More specifically, as one example, instead of the step functions F1 to F4 illustrated in FIG. 11, other functions than the step function may be used. Alternatively, the luminance determination unit 620 may perform conversion from illuminance into luminance by more complicated procedures, rather than performing conversion from illuminance into luminance merely using the function. In such a case, as one example, when at least two processes having different ratios of the output luminance value to the input illuminance value can be set, the present embodiment can be used to various applications.

Modification

Figure 13:
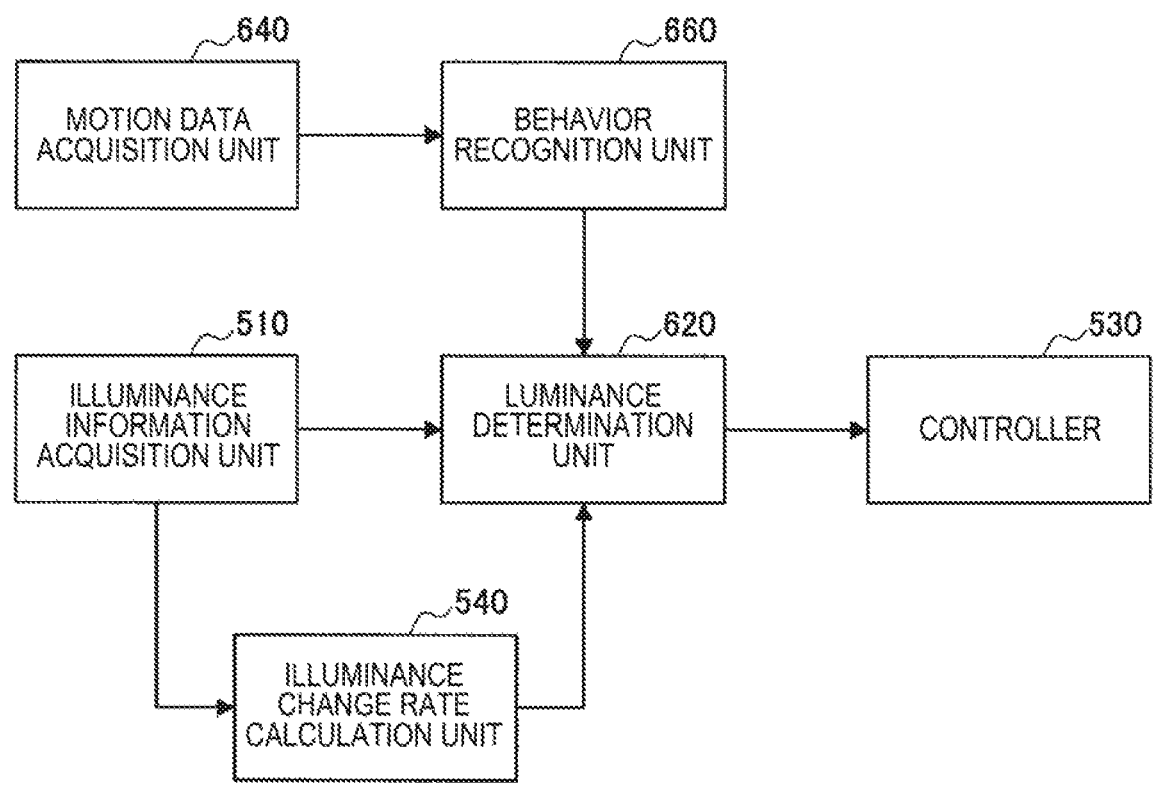
FIG. 13 is a block diagram showing a functional configuration for controlling the luminance of image display light in a modification of the second embodiment of the present disclosure.

A modification of the second embodiment of the present disclosure is described. A functional configuration according to the modification is illustrated in FIG. 13. Referring to FIG. 13, in the present modification, the motion data analysis unit 650 in the functional configuration according to the second embodiment shown in FIG. 10 is replaced with a behavior recognition unit 660.

As described above, the process of detection of the user's motion based on the motion data is the technology known as behavior recognition. An example of the behavior recognition technology includes the known technology that provides more advanced recognition performance including a behavior pattern over a relatively long time or a behavior associated with the attribute of a location, as disclosed in JP 2011-081431A, JP 2012-008771A, or the like. The behavior recognition unit 660 recognizes the user's behavior by using such various behavior recognition technologies. The analysis performed by the motion data analysis unit 650 is specific to the recognition of the user's motion, while the behavior recognition unit 660 is capable of recognizing various behaviors of the user in addition to the user's motion as necessary. In the present modification, the information indicating the user's behavior is an example of the information of the situation information indicating a situation (situation of the user who wears the display unit 110) surrounding the display unit 110 (wearable optical device). Thus, the behavior recognition unit 660 can be understood to serve as a situation information acquisition unit configured to acquire the situation information.

The behavior recognition unit 660 may execute the behavior recognition on the basis of a value output from other various sensors in addition to the value output from the motion sensor. As one example, the behavior recognition unit 660 may execute the behavior recognition by using, as a sensor, the illuminance sensor 116 or the camera 120 included in the display unit 110 of the HMD 100, the microphone 172 included in the control unit 160, or the sensor 210, the GPS receiver 216, or the microphone 218 included in the smartphone 200, on the basis of the value output from these components. These sensors are worn on the user (viewer) of the HMD 100, as an example. These sensors may be integrated with the display unit 110 (wearable optical device) of the HMD 100, or may be incorporated into other electronic apparatus, for example, electronic equipment worn or carried by the user, such as the control unit 160 and the smartphone 200.

The process performed by the behavior recognition unit 660 sometimes has a high processing load, or it may be necessary to have access to the stored data. Thus, the process to be performed by the behavior recognition unit 660 may be executed in a different electronic apparatus from other functional components, that is, the illuminance information acquisition unit 510, the luminance determination unit 620, and the controller 530. As one example, when the illuminance information acquisition unit 510, the luminance determination unit 620, and the controller 530 are implemented by the processor 162 included in the control unit 160 of the HMD 100, the behavior recognition unit 660 may be implemented by the processor 202 of the smartphone 200 or by the processor 302 of the server 300.

In the present modification, the control of the luminance of the image display light in response to various user behaviors, which are not limited to motion such as standing still and moving, makes it possible to enhance visibility of the image provided by the HMD 100 in a wide variety of situations.

3. THIRD EMBODIMENT

A third embodiment of the present disclosure is described. In the third embodiment, a system 10 that is similar to that of the first embodiment executes a luminance control of the image display light, which is different from the first embodiment. Thus, the repeated description of the system configuration that is common to the first embodiment will be omitted, thus a process of the luminance control is mainly described.

Figure 14:
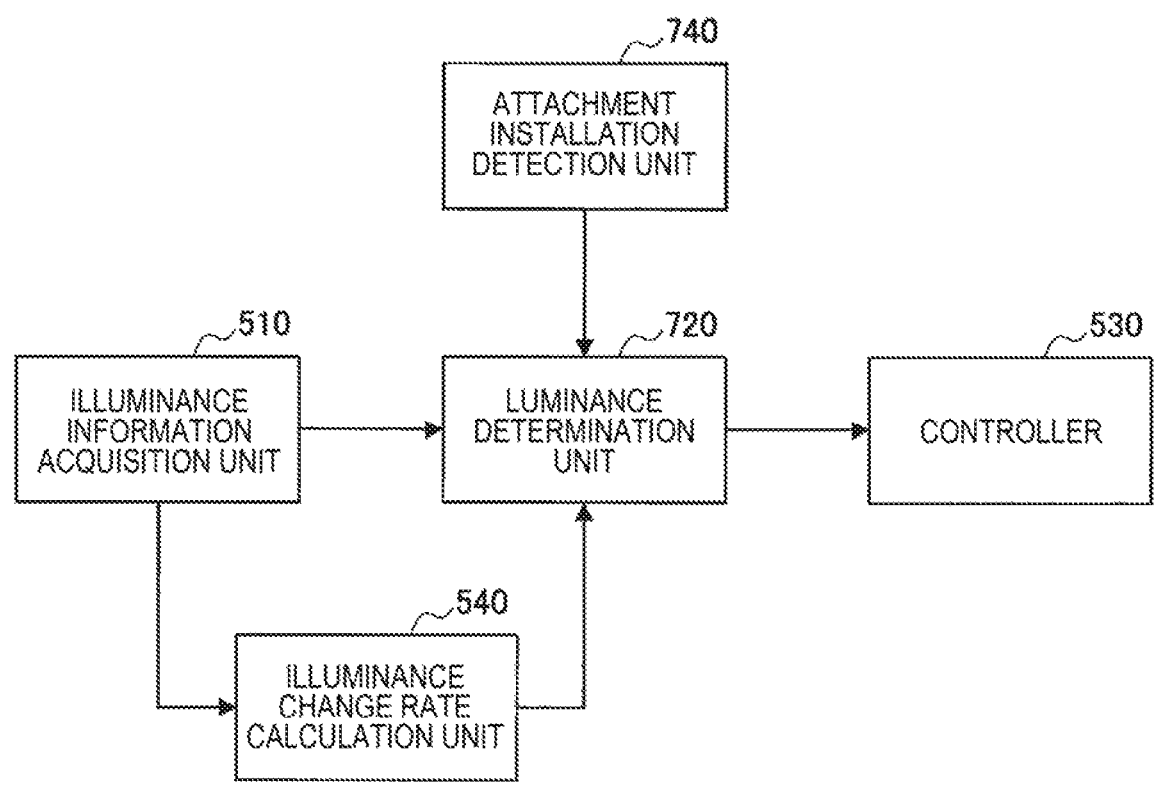
FIG. 14 is a block diagram showing a functional configuration for controlling the luminance of image display light in a third embodiment of the present disclosure.

FIG. 14 is a block diagram showing a functional configuration for controlling the luminance of image display light in the third embodiment of the present disclosure. Referring to FIG. 14, the luminance control of the image display light in the present embodiment is implemented by the functional configuration that includes an illuminance information acquisition unit 510, a luminance determination unit 720, a controller 530, an illuminance change rate calculation unit 540, and an attachment installation detection unit 740. These functional components are implemented, for example, by any of the processor 162 included in the control unit 160 of the HMD 100, the processor 202 of the smartphone 200, and the processor 302 of the server 300, or implemented in cooperation between them, which is similar to the first embodiment.

The illuminance information acquisition unit 510, the controller 530, and the illuminance change rate calculation unit 540 have the functional configuration similar to that of the first embodiment, and thus the repeated description will be omitted. In addition, the illuminance change rate calculation unit 540 may not be necessarily provided as long as the user's safety can be secured using other means when the periphery of the HMD 100 becomes dark suddenly. In the case where the illuminance change rate calculation unit 540 is provided, the luminance determination unit 720 performs an operation in a way similar to that performed by the luminance determination unit 520 according to the first embodiment when the illuminance change rate calculation unit 540 detects a rapid decrease in illuminance, and thus repeated description will be omitted.

The attachment installation detection unit 740 acquires attachment installation information that indicates an installation state of an optical attachment of the display unit 110, for example, sunglasses. The attachment installation information is generated by detecting a connection between the display unit 110 and the attachment using a switch, as an example. In the present embodiment, the information indicating the installation state of the optical attachment, which is detected by the attachment installation detection unit 740, is an example of the situation information indicating a situation surrounding the display unit 110 (wearable optical device). Thus, the attachment installation detection unit 740 can be understood to serve as a situation information acquisition unit configured to acquire the situation information.

Figure 15:
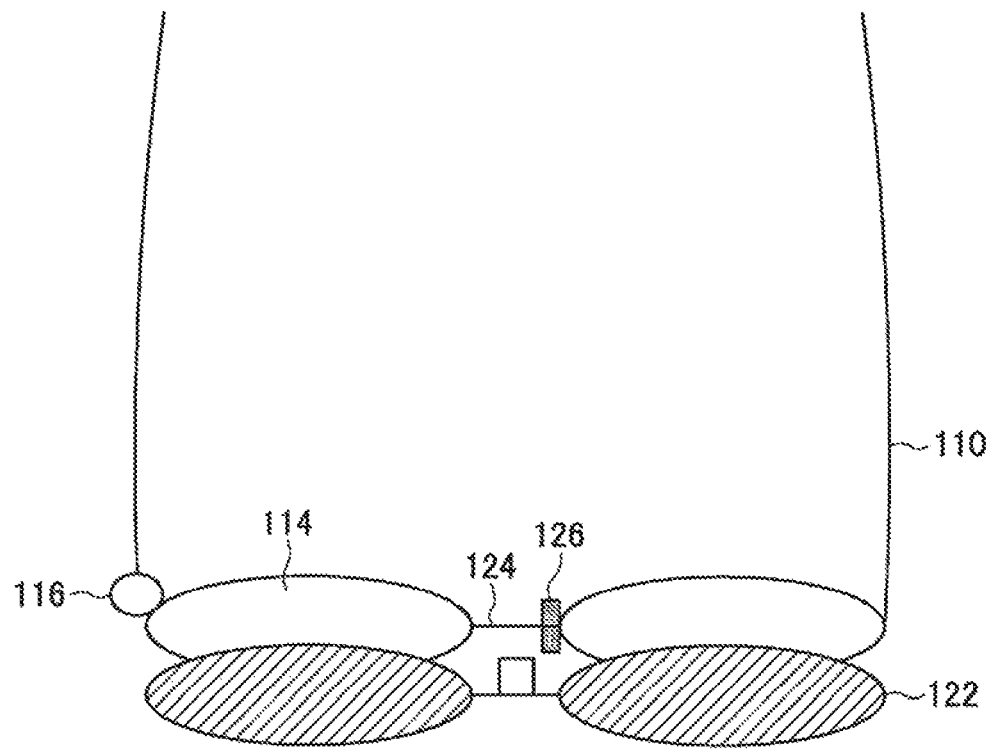
FIG. 15 is a diagram showing an example of the installation of an optical attachment in the third embodiment of the present disclosure.

A specific example of such configuration is illustrated in FIG. 15. Referring to FIG. 15, in the present embodiment, the display unit 110 is provided with a connection part 124 used in installing the sunglasses 122 in the display unit 110. The connection part 124 may be a concave portion in which a convex portion provided in the sunglasses 122 is fitted as an example, or may be a region for allowing the sunglasses 122 to be fixed by a clip. The connection part 124 is provided with a connection detection switch 126. The connection detection switch 126 is a switch that is turned on when the sunglasses 122 is connected to the connection part 124. As one example, the attachment installation detection unit 740 implemented by the processor 162 of the control unit 160 as an example, when receiving a signal output in the case where the connection detection switch 126 is turned on, determines that the sunglasses 122 is installed in the display unit 110.

In the present embodiment, the sunglasses 122 cover a region of the light guide plate 114 corresponding to the user's eyes, but do not cover the illuminance sensor 116. In other words, the illuminance information acquired by the illuminance information acquisition unit 510 in the present embodiment is generated on the basis of the output value of the illuminance sensor 116 (an optical sensor) that not optically affected by the sunglasses 122 (an optical attachment). Thus, such a change in illuminance is not incorporated into the illuminance information even when a decrease in the illuminance of light incident from the real space occurs due to the installation of the sunglasses 122. In this case, if the luminance determination unit 720 determines the luminance of the image display light in a similar manner to the case where the sunglasses 122 is not installed, the luminance of the image display light is excessively high. Thus, it is likely to be difficult to visually recognize the real space of the background to be viewed through the sunglasses 122.

Thus, the luminance determination unit 720 determines the luminance of the image display light, on the basis of the illuminance information acquired by the illuminance information acquisition unit 510 and the attachment installation information provided by the attachment installation detection unit 740. The optical properties of the optical attachment are previously registered. As one example, for the sunglasses 122, the illuminance drop amount of light incident from the real space, which is caused by the sunglasses 122 installed in the display unit 110, is previously registered in the memory 164 included in the control unit 160, the memory 204 included in the smartphone 200, or the memory 304 included in the server 300. When the attachment installation information indicates that the sunglasses 122 is installed, the luminance determination unit 720 allows the optical influence caused by the installation of the sunglasses 122, that is, the decrease in luminance of the light incident from the real space to be incorporated into the luminance of the image display light.

Figure 16:
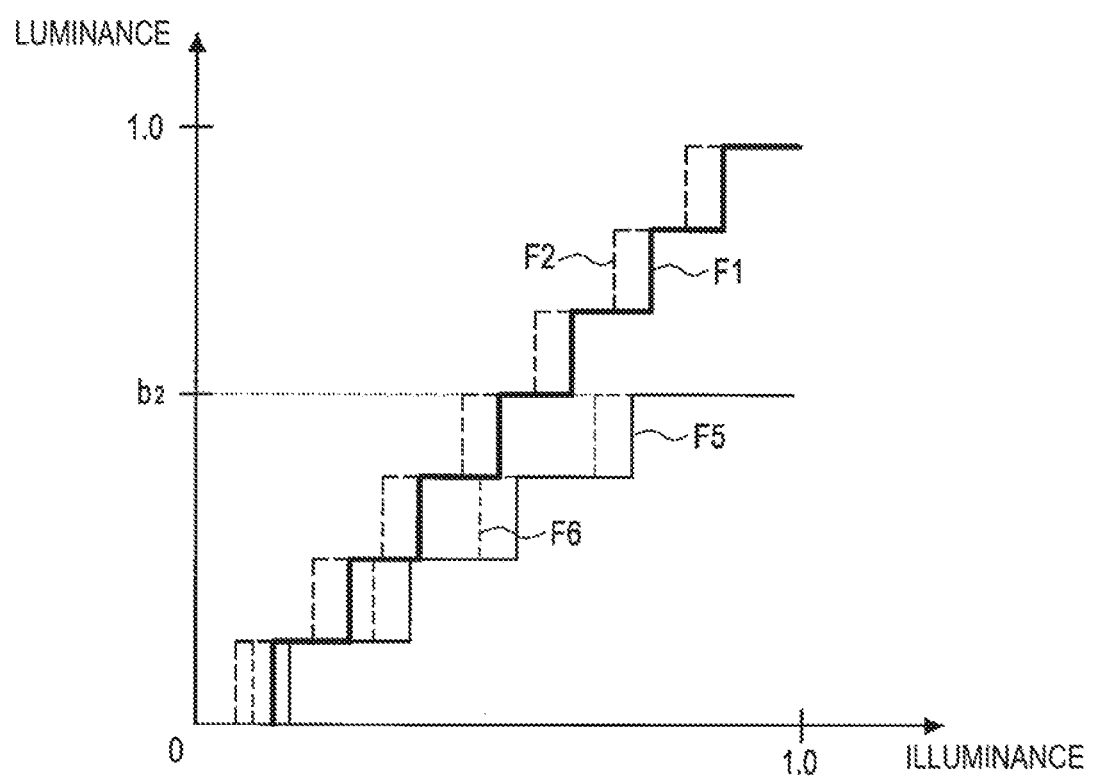
FIG. 16 is a flowchart showing an example of a process in the third embodiment of the present disclosure.

An example of the process performed by the luminance determination unit 720 is further described with reference to FIG. 16. In the example shown in FIG. 16, the luminance determination unit 720 selects functions to be used in determining the luminance from among the step functions F1 and F2 and step functions F5 and F6. The step functions F1 and F2 are similar to those of FIG. 6, and the step function F2 is obtained by offsetting the step function F1 in the negative direction of the illuminance. On the other hand, the step functions F5 and F6 are similar to the step functions F1 and F2 in terms of a set of step functions that are offset to each other but they have a slope forming a step that is more gradual than the step functions F1 and F2, their output luminance values are saturated at a predetermined luminance b2. In this example, if the attachment installation information indicates that the sunglasses 122 are installed, the luminance determination unit 720 converts the illuminance into the luminance using the step functions F5 and F6, otherwise, converts the illuminance into the luminance using the step functions F1 and F2. Such a process allows the decrease in the illuminance of the light incident from the real space caused by the installation of the sunglasses 122 to be incorporated into the luminance of the image display light determined by the luminance determination unit 720, thereby determining more suitable luminance of the image display light in a state where the sunglasses 122 is installed.

The third embodiment of the present disclosure described above may be implemented independently of, or in combination with, the first embodiment and/or the second embodiment. More specifically, as one example, instead of the step functions F1 and F2 and the step functions F5 and F6 illustrated in FIG. 16, other functions than the step function may be used. Alternatively, the luminance determination unit 720 may perform conversion from illuminance into luminance by more complicated procedures, rather than performing conversion from illuminance into luminance merely using the function. In such a case, when at least two processes that are capable of incorporating the optical influence caused by an optical attachment such as the sunglasses 122 into the luminance of the image display light can be set, the present embodiment can be used to various applications.

4. FOURTH EMBODIMENT

A fourth embodiment of the present disclosure is described. In the fourth embodiment, a system 10 that is similar to that of the first embodiment executes a process of removing noise contained in the illuminance, in addition to the luminance control of the image display light that is similar to any one of the first to third embodiments. Thus, the repeated description of the system configuration and luminance control process that are common to the above-described embodiments will be omitted, thus a process of removing noise of the illuminance is mainly described. The following description will be given of the case where the noise removal process is executed in addition to the luminance control that is similar to the first embodiment for simplicity, but such noise removal process may be executed in addition to the luminance control that is similar to the second or third embodiment.

Figure 17:
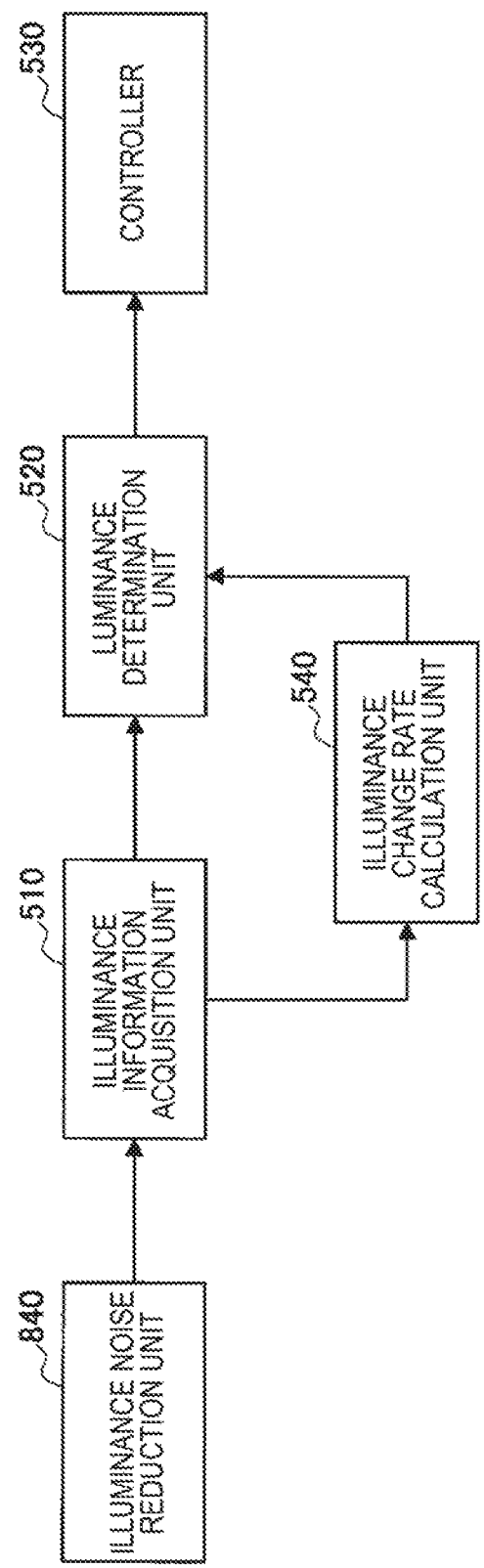
FIG. 17 is a block diagram showing a functional configuration for controlling the luminance of image display light in a fourth embodiment of the present disclosure.

FIG. 17 is a block diagram showing a functional configuration for controlling the luminance of the image display light in the fourth embodiment of the present disclosure.

Referring to FIG. 17, in the present embodiment, in addition to the illuminance information acquisition unit 510, the luminance determination unit 520, the controller 530, and the illuminance change rate calculation unit 540, which are similar to the first embodiment, an illuminance noise reduction unit 840 is provided in a stage preceding the illuminance information acquisition unit 510. The respective functional components including the illuminance noise reduction unit 840 are implemented by any one of the processor 162 included in the control unit 160 of the HMD 100, the processor 202 of the smartphone 200, and the processor 302 of the server 300, or are implemented in collaboration with each other. The illuminance change rate calculation unit 540 may not be necessarily provided as long as the user's safety can be secured using other means when the periphery of the HMD 100 becomes dark suddenly.

Figure 18:
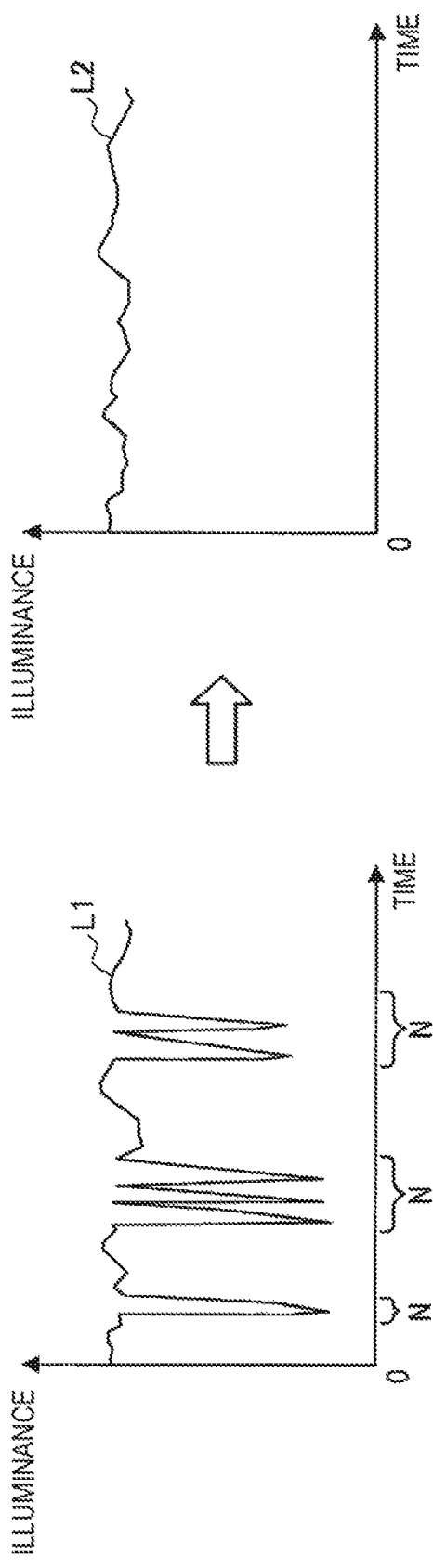
FIG. 18 is a diagram illustrated to describe noise reduction in the fourth embodiment of the present disclosure.

In the present embodiment, the illuminance noise reduction unit 840 removes noise generated in the value obtained by detecting the illuminance when the illuminance sensor 116 is covered by hair, as an example. A specific example of such a process is illustrated in FIG. 18. In the example shown in FIG. 18, a deep valley-shaped noise component N is removed from illuminance L1 before the noise removal process to obtain illuminance L2. This, even when the illuminance decreases instantaneously because the illuminance sensor 116 is covered by hair as an example, prevents an image from becoming dark due to such a change in illuminance incorporated into the luminance of the image display light.

Figure 19:
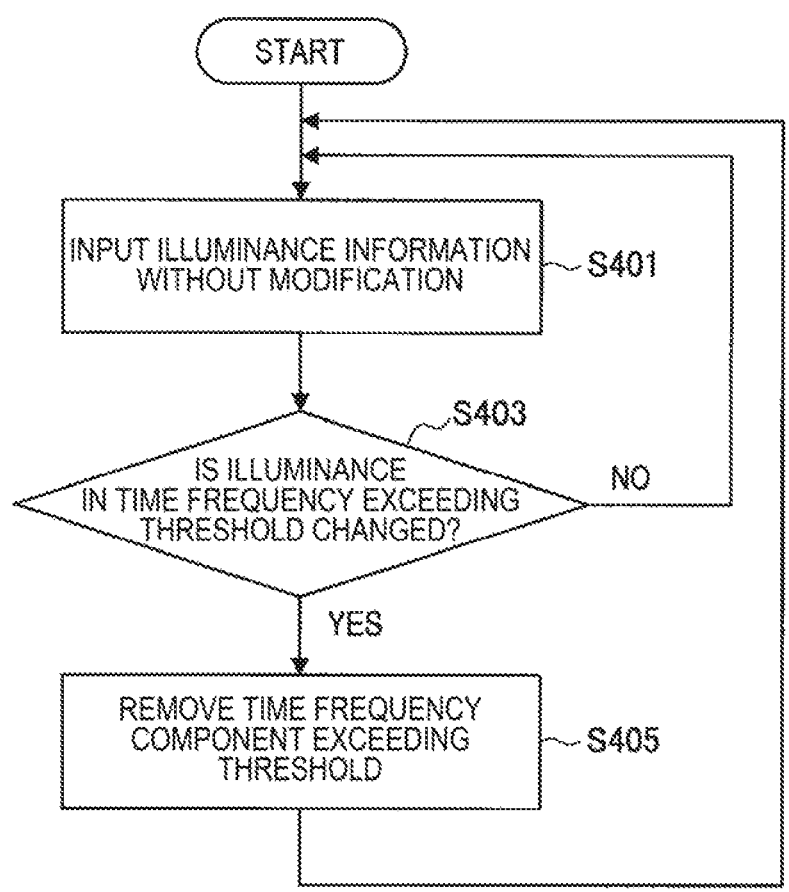
FIG. 19 is a flowchart showing an example of the operation of an illuminance noise reduction unit in the fourth embodiment of the present disclosure.

FIG. 19 is a flowchart showing an example of the operation performed by the illuminance noise reduction unit 840 in the present embodiment. Referring to FIG. 19, in normal state, the illuminance noise reduction unit 840 is set to off, that is, the illuminance information acquired from the illuminance sensor 116 is set to be provided to the illuminance information acquisition unit 510 without modification (S401). Then, if a change in illuminance in time frequency exceeding a threshold is detected in the illuminance indicated by the illuminance information (YES in S403), the illuminance noise reduction unit 840 is turned on. More specifically, the illuminance noise reduction unit 840 removes a component corresponding to the change in illuminance in time frequency exceeding a threshold from the illuminance indicated by the illuminance information (S405). As one example, the illuminance noise reduction unit 840 may detect a change in illuminance in time frequency exceeding a threshold in step S403 using a high-pass filter. Furthermore, the illuminance noise reduction unit 840 may remove the time-frequency component (corresponding to noise) exceeding a threshold using a low-pass filter.

5. HARDWARE CONFIGURATION

Figure 20:
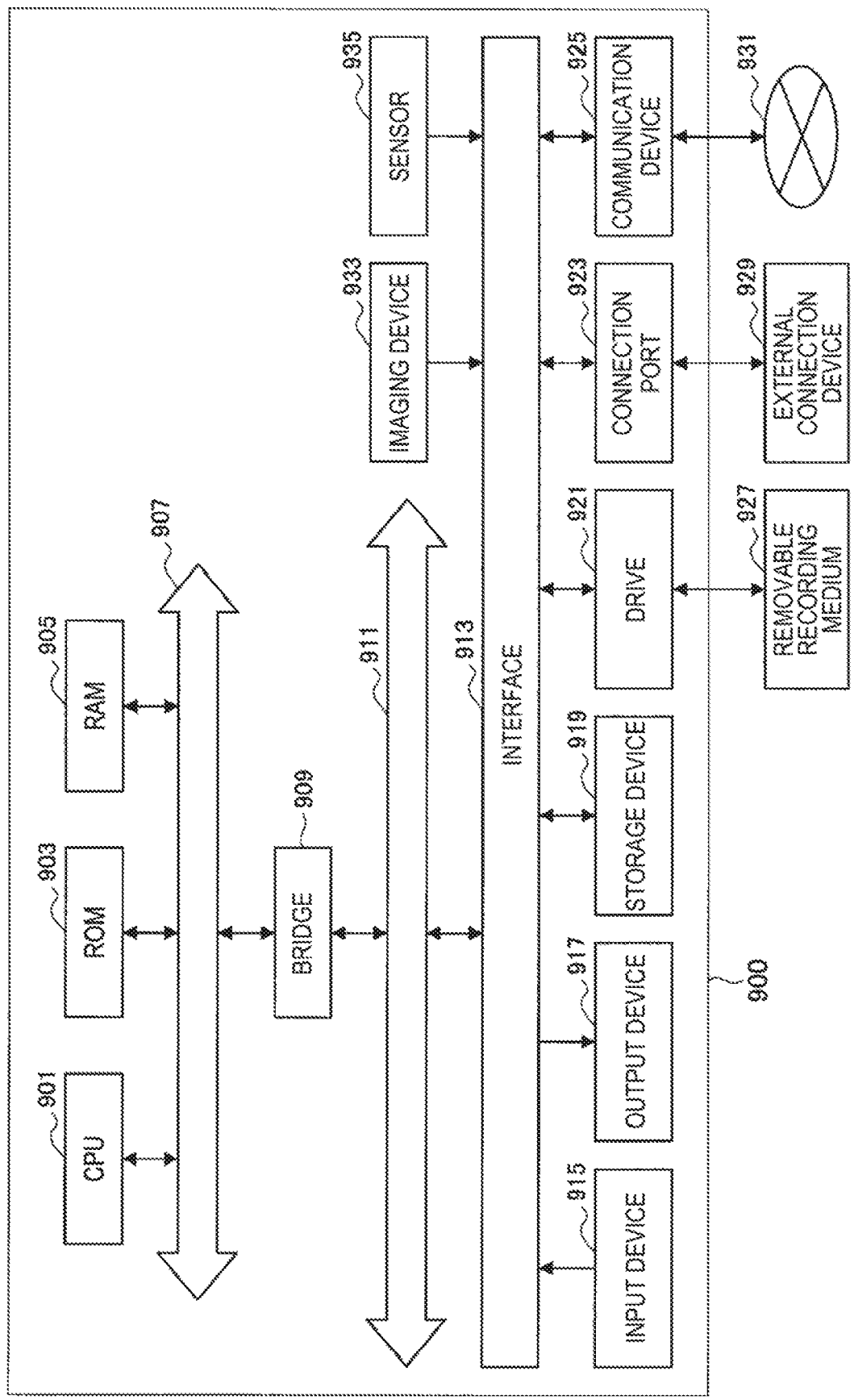
FIG. 20 is a block diagram showing an example of a hardware configuration of an electronic apparatus according to an embodiment of the present disclosure.

Next, a hardware configuration of an electronic apparatus according to an embodiment of the present disclosure will be described with reference to FIG. 20. FIG. 20 is a block diagram showing an example of the hardware configuration of the electronic apparatus according to the embodiment of the present disclosure. The illustrated electronic apparatus 900 can realize, for example, the HMD 100, the smartphone 200, and/or the server devices constituting the server 300 of the above-described embodiments.

The electronic apparatus 900 includes a CPU (Central Processing Unit) 901, a ROM (Read Only Memory) 903, and a RAM (Random Access Memory) 905. In addition, the electronic apparatus 900 may include a host bus 907, a bridge 909, an external bus 911, an interface 913, an input device 915, an output device 917, a storage device 919, a drive 921, a connection port 923, and a communication device 925. Further, the electronic apparatus 900 may include an imaging device 933 and a sensor 935 as necessary. The electronic apparatus 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the electronic apparatus 900 in accordance with various programs recorded in the ROM 903, the RAM 905, the storage device 919 or a removable recording medium 927. The ROM 903 stores programs and operation parameters which are used by the CPU 901. The RAM 905 temporarily stores program which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the electronic apparatus 900. Furthermore, the input device 915 includes an input control circuit which generates an input signal on the basis of the information which is input by a user and outputs the input signal to the CPU 901. By operating the input device 915, a user can input various types of data to the electronic apparatus 900 or issue instructions for causing the electronic apparatus 900 to perform a processing operation.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the electronic apparatus 900 in a form of a video such as text or an image, and an audio such as voice or sound.

The storage device 919 is a device for data storage which is configured as an example of a storage unit of the electronic apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the electronic apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the electronic apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the electronic apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the electronic apparatus 900, such as the orientation of the case of the electronic apparatus 900, as well as information regarding the environment surrounding the electronic apparatus 900, such as the brightness or noise surrounding the electronic apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the electronic apparatus 900. Each of the above components may be realized using general-purpose members, but may also be realized in hardware specialized in the function of each component. Such a configuration may also be modified as appropriate according to the technological level at the time of the implementation.

6. SUPPLEMENT

The embodiments of the present disclosure may include the electronic apparatus, the system, the method executed in the electronic apparatus or the system, the program for causing the electronic apparatus to function, and the non-transitory tangible media having the program recorded thereon, which have been described above, for example.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

Additionally, the present technology may also be configured as below.

(1)

An electronic apparatus including:

an illuminance information acquisition unit configured to acquire illuminance information indicating illuminance of light incident on a wearable optical device toward a viewer from a real space;

a situation information acquisition unit configured to acquire situation information indicating a situation surrounding the wearable optical device;

a luminance determination unit configured to determine luminance of light emitted by the wearable optical device to allow the viewer to perceive an image superimposed on the real space, the determination of luminance being performed on a basis of the illuminance information and the situation information; and a controller configured to control the wearable optical device to cause the wearable optical device to emit light having the determined luminance.

(2)

The electronic apparatus according to (1), wherein the situation information includes information indicating a rate of change in illuminance indicated by the illuminance information, and wherein the luminance determination unit minimizes a delay of a change in the luminance with respect to a change in the illuminance when the rate of change indicates a rapid decrease of illuminance.

(3)

The electronic apparatus according to (1), wherein the luminance determination unit selects a process of determining the luminance based on the illuminance information from among a plurality of candidate processes on a basis of the situation information.

(4)

The electronic apparatus according to (3), wherein the situation information includes information indicating a rate of change in illuminance indicated by the illuminance information, wherein the plurality of candidate processes include a first process having a delay of the luminance with respect to a change in illuminance indicated by the illuminance information and a second process that does not have the delay, and wherein the luminance determination unit selects the second process in a case in which the rate of change indicates a rapid decrease of illuminance and selects the first process in other cases.

(5)

The electronic apparatus according to (4), wherein the first process prevents a rapid change in the luminance.

(6)

The electronic apparatus according to any one of (3) to (5), wherein the situation information includes information generated on a basis of a value output from a motion sensor attached to the viewer.

(7)

The electronic apparatus according to (6), wherein the plurality of candidate processes include a first process of converting illuminance indicated by the illuminance information into the luminance at a first ratio and a second process of converting the illuminance indicated by the illuminance information into the luminance at a second ratio lower than the first ratio, and wherein the luminance determination unit selects the second process in a case in which the situation information indicates occurrence of a motion for translating a range of the real space included in a field of view of the viewer and selects the first process in other cases.

(8)

The electronic apparatus according to any one of (1) to (7), wherein the situation information includes behavior information indicating behavior of the viewer.

(9)

The electronic apparatus according to (8), wherein the behavior information is generated on a basis of a value output from a sensor integrated with the wearable optical device.

(10)

The electronic apparatus according to any one of (1) to (9), wherein the situation information includes attachment installation information indicating an installation state of an optical attachment in the wearable optical device.

(11)

The electronic apparatus according to (10), wherein the attachment installation information is provided by a switch configured to detect a connection between the wearable optical device and the attachment.

(12)

The electronic apparatus according to (10) or (11), wherein the illuminance information is generated on a basis of a value output from an optical sensor that is not subject to optical influence due to the attachment, and wherein the luminance determination unit incorporates optical influence caused by installing the attachment into the determined luminance when the attachment installation information indicates that the attachment is installed on a basis of a previously registered optical property of the attachment.

(13)

The electronic apparatus according to any one of (1) to (12), wherein the luminance determination unit converts illuminance indicated by the illuminance information into the luminance using a step function.

(14)

The electronic apparatus according to (13), wherein the step function includes a first step function used when the illuminance indicated by the illuminance information increases and a second step function used when the illuminance indicated by the illuminance information decreases, and wherein the second step function is offset from the first step function in a negative direction of illuminance.

(15)
The electronic apparatus according to (13) or (14), wherein the luminance determination unit smoothes the luminance obtained using the step function.

(16)
The electronic apparatus according to any one of (1) to (15), further including:
an illuminance noise reduction unit configured to reduce noise included in the illuminance.

(17)
The electronic apparatus according to (16), wherein, when a change in the illuminance in time frequency exceeding a threshold is detected, the illuminance noise reduction unit removes a component corresponding to the change from the illuminance.

(18)
A method of providing an image, including:
detecting illuminance of light incident on a wearable optical device toward a viewer from a real space;
acquiring situation information indicating a situation surrounding the wearable optical device;
determining luminance on a basis of the illuminance and the situation information; and
emitting light having the determined luminance by the wearable optical device, the light being used to allow the viewer to perceive an image superimposed on the real space.

REFERENCE SIGNS LIST 1 system
100 HMD
110 display unit
112 light source
114 light guide plate
116 illuminance sensor
118 motion sensor
122 sunglasses
124 connection part
126 switch
160 control unit
162 processor
164 memory
200 smartphone
202 processor
204 memory
300 server
302 processor
304 memory
510 illuminance information acquisition unit
520, 620, 720 luminance determination unit
530 controller
540 illuminance change rate calculation unit
640 motion data acquisition unit
650 motion data analysis unit
660 behavior recognition unit
740 attachment installation detection unit
840 noise reduction unit

The invention claimed is:

1. An electronic apparatus, comprising:
at least one processor configured to:
acquire illuminance information indicating illuminance of first light incident on a wearable optical device, wherein the first light is incident from a real space towards the wearable optical device associated with a viewer;
acquire situation information indicating a situation that surrounds the wearable optical device;
select a first step function and a second step function from a plurality of step functions for conversion of the illuminance of the first light into a luminance of a second light emitted from the wearable optical device, wherein each step function of the plurality of step functions corresponds to a relationship between the illuminance of the first light and the luminance of the second light;
determine the luminance of the second light emitted from the wearable optical device based on the illuminance information and the situation information;
convert, by one of the first step function or the second step function, the illuminance of the first light into the luminance of the second light;
switch from the first step function to the second step function based on a decrease of the illuminance of the first light after an increase of the illuminance of the first light beyond a first boundary value of the first step function and increase of the luminance of the second light by a step of the first step function, wherein
the luminance of the second light is kept constant until the illuminance of the first light is lower than a second boundary value of the second step function, and
the second boundary value is lower than the first boundary value; and
control the wearable optical device to emit the second light at the luminance of the second light.

2. The electronic apparatus according to claim 1, wherein
the situation information further indicates a rate of change in the illuminance of the first light,
the rate of change in the illuminance of the first light indicates the decrease of the illuminance of the first light, and
the at least one processor is further configured to decrease a delay of a first change in the luminance of the second light with respect to a second change in the illuminance of the first light based on the rate of change in the illuminance.

3. The electronic apparatus according to claim 1, wherein the at least one processor is further configured to:
select a process from a plurality of candidate processes based on the situation information; and
determine the luminance of the second light based on the illuminance information and the selected process.

4. The electronic apparatus according to claim 3, wherein
the situation information further indicates a rate of change in the illuminance of the first light,
the plurality of candidate processes includes a first process and a second process,
the first process includes a delay of a first change in the luminance of the second light with respect to a second change in the illuminance of the first light,
the second process excludes the delay of the first change, and
the at least one processor is further configured to select the second process based on the decrease of the illuminance indicated by the rate of change.

5. The electronic apparatus according to claim 4, wherein the first change in the luminance of the second light is based on the first process.

6. The electronic apparatus according to claim 3, wherein the situation information is based on a value output from a motion sensor attached to the wearable optical device of the viewer.

7. The electronic apparatus according to claim 6, wherein the plurality of candidate processes includes a first process to convert the illuminance into the luminance at a first ratio, and a second process to convert the illuminance into the luminance at a second ratio,
the second ratio is lower than the first ratio,
the at least one processor is further configured to select the second process based on the situation information, and
the situation information further indicates occurrence of a motion to translate a range of the real space included in a field of view of the viewer.

8. The electronic apparatus according to claim 1, wherein the situation information further includes behavior information indicating a behavior of the viewer.

9. The electronic apparatus according to claim 8, wherein the behavior information is based on a value output from a sensor integrated with the wearable optical device.

10. The electronic apparatus according to claim 1, wherein the situation information further includes attachment installation information indicating an installation state of an optical attachment in the wearable optical device.

11. The electronic apparatus according to claim 10, further comprising a switch configured to detect a connection between the wearable optical device and the optical attachment, wherein the at least one processor is further configured to determine the attachment installation information based on an output of the switch.

12. The electronic apparatus according to claim 10,
wherein the at least one processor is further configured to:
generate the illuminance information based on a value output from an optical sensor,
wherein the optical sensor is independent of an optical influence by the optical attachment; and
control incorporation of the optical influence into the luminance based on a registered optical property of the optical attachment and based on the attachment installation information which indicates installation of the optical attachment,
wherein the optical influence is based on the installation of the optical attachment.

13. The electronic apparatus according to claim 1,
wherein the second step function is offset from the first step function in a negative direction of the illuminance.

14. The electronic apparatus according to claim 1, wherein the at least one processor is further configured to smoothen the luminance of the second light.

15. The electronic apparatus according to claim 1, wherein the at least one processor is further configured to reduce noise included in the illuminance.

16. The electronic apparatus according to claim 15, wherein
the at least one processor is further configured to remove, from the illuminance, a component that corresponds to a first change in the illuminance,
the component is removed based on a detection of the first change in the illuminance in time frequency, and
the first change in the illuminance exceeds a threshold value.

17. An image processing method, comprising:
detecting illuminance of first light incident on a wearable optical device, wherein the first light is incident from a real space toward the wearable optical device associated with a viewer;
acquiring situation information indicating a situation surrounding the wearable optical device;
selecting a first step function and a second step function from a plurality of step functions for conversion of the illuminance of the first light into a luminance of a second light emitted from the wearable optical device, wherein each step function of the plurality of step functions corresponds to a relationship between the illuminance of the first light and the luminance of the second light;
determining the luminance of the second light emitted from the wearable optical device based on the detected illuminance and the situation information;
converting, by one of the first step function or the second step function, the illuminance of the first light into the luminance of the second light;
switching from the first step function to the second step function based on a decrease of the illuminance of the first light after an increase of the illuminance of the first light beyond a first boundary value of the first step function and increase of the luminance of the second light by a step of the first step function, wherein
the luminance of the second light is kept constant until the illuminance of the first light is lower than a second boundary value of the second step function, and
the second boundary value is lower than the first boundary value; and
controlling the wearable optical device to emit the second light at the luminance of the second light.

* * * * *